(12) United States Patent
Park et al.

(10) Patent No.: US 12,475,933 B2
(45) Date of Patent: Nov. 18, 2025

(54) MEMORY MODULE AND ELECTRONIC SYSTEM INCLUDING THE SAME

(71) Applicant: Samsung Electronics Co., Ltd., Suwon-si (KR)

(72) Inventors: Jin Kwan Park, Suwon-si (KR); Daehyun Kwon, Suwon-si (KR); Jang Hoo Kim, Suwon-si (KR); Chang-Hyun Bae, Suwon-si (KR); Yoo-Chang Sung, Suwon-si (KR); Hye-Seung Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 18/413,180

(22) Filed: Jan. 16, 2024

(65) Prior Publication Data

US 2024/0386921 A1 Nov. 21, 2024

(30) Foreign Application Priority Data

May 19, 2023 (KR) ........................ 10-2023-0065058

(51) Int. Cl.
*G11C 7/10* (2006.01)
*H03K 19/00* (2006.01)

(52) U.S. Cl.
CPC ....... *G11C 7/1048* (2013.01); *H03K 19/0005* (2013.01)

(58) Field of Classification Search
CPC ..... G11C 7/1048; G11C 5/063; G11C 7/1057; G11C 7/1084; G11C 7/12; H03K 19/0005; G06F 13/4234

USPC .................................................... 365/189.18
See application file for complete search history.

(56) References Cited

U.S. PATENT DOCUMENTS

| | | | |
|---|---|---|---|
| 9,432,298 B1 * | 8/2016 | Smith | ................. H04L 49/9057 |
| 10,498,139 B2 | 12/2019 | Fan | |
| 10,498,564 B2 | 12/2019 | Far et al. | |
| 10,529,480 B2 | 1/2020 | Fan | |
| 10,601,222 B2 | 3/2020 | Fan | |
| 10,608,681 B2 | 3/2020 | Sugioka | |
| 10,727,892 B2 | 7/2020 | Zhang et al. | |
| 10,749,526 B1 | 8/2020 | Yu et al. | |
| 11,088,719 B1 | 8/2021 | Liu et al. | |

(Continued)

FOREIGN PATENT DOCUMENTS

KR 10-2019-0089453 A 7/2019

*Primary Examiner* — Huan Hoang
(74) *Attorney, Agent, or Firm* — Muir Patent Law, PLLC

(57) ABSTRACT

A memory module includes a plurality of memory devices. Each of the plurality of memory devices includes a plurality of data input/output pads, a plurality of on-die termination (ODT) circuits each including one or more resistors, a plurality of transceiver circuits each including one or more transmission drivers and one or more reception buffers, and a plurality of equalizer circuits each including one or more inductors. Each of the plurality of equalizer circuits is connected to one of the plurality of data input/output pads, one of the plurality of ODT circuits, and one of the plurality of transceiver circuits. Each of the one or more transmission drivers drives a node of one of the plurality of data input/output pads. Inductances of the one or more inductors have individual values which are based on a driver strength of each of the one or more transmission drivers.

20 Claims, 18 Drawing Sheets

(56) References Cited

U.S. PATENT DOCUMENTS

| | | | |
|---|---|---|---|
| 2007/0070763 A1* | 3/2007 | Kim | G11C 7/1048 365/222 |
| 2019/0089150 A1 | 3/2019 | Gharibdoust et al. | |
| 2020/0280295 A1 | 9/2020 | Fan et al. | |

* cited by examiner

MEMORY MODULE AND ELECTRONIC SYSTEM INCLUDING THE SAME

CROSS-REFERENCE TO RELATED APPLICATION(S)

This application claims priority under 35 U.S.C. § 119 to Korean Patent Application No. 10-2023-0065058 filed on May 19, 2023, in the Korean Intellectual Property Office, the disclosure of which is incorporated by reference herein in its entirety.

BACKGROUND

Embodiments of the present disclosure described herein relate to a semiconductor device, and more particularly, relate to a memory module and an electronic system including the same.

As the degree of integration of memory devices included in a memory module increases and a data rate increases, nowadays, the performance of an equalizer circuit for compensating for the loss capable of occurring in the process of transferring a data signal at a high speed through an interface channel becomes more important.

The equalizer circuit using an inductor is used even in the memory module. Because the above equalizer circuit does not require an external power, the power consumption of the equalizer circuit is small. However, in the case where an inductor having an inductance value appropriate for a driver strength, which a host device requires to drive memory devices, or any other conditions is not used, the above equalizer circuit makes the performance of interface worse. Therefore, a proper equalizer circuit in an interface channel may be useful for transferring a data signal at a high speed.

SUMMARY

Embodiments of the present disclosure provide a memory module including equalizer circuits reducing power consumption and improving the performance of an interface channel.

Embodiments of the present disclosure provide an electronic system including the memory module.

According to an embodiment, a memory module includes a plurality of memory devices. Each of the plurality of memory devices includes a plurality of data input/output pads, a plurality of on-die termination (ODT) circuits each including one or more resistors, a plurality of transceiver circuits each including one or more transmission drivers and one or more reception buffers, and a plurality of equalizer circuits each including one or more inductors. Each of the plurality of equalizer circuits is connected to one of the plurality of data input/output pads, one of the plurality of ODT circuits, and one of the plurality of transceiver circuits. Each of the one or more transmission drivers may be configured to drive a node of one of the plurality of data input/output pads. Inductances of the one or more inductors included in each of the plurality of equalizer circuits have individual values which are based on a driver strength of each of the one or more transmission drivers.

According to an embodiment, a memory module includes a plurality of memory devices. Each of the plurality of memory devices includes a plurality of data input/output pads, a plurality of transceiver circuits each including one or more transmission buffers and one or more reception buffers, and a plurality of equalizer circuits each including one or more inductors. Each of the plurality of equalizer circuits is connected to one of the plurality of data input/output pads and one of the plurality of transceiver circuits. Each of the one or more transmission buffers may be configured to drive a node of one of the plurality of data input/output pads. Inductances of the one or more inductors included in each of the plurality of equalizer circuits have individual values which are based on a driver strength of each of the one or more transmission buffers.

According to an embodiment, an electronic system includes a host device and a memory module. The memory module operates under control of the host device. The memory module includes a plurality of memory devices. Each of the plurality of memory devices includes a plurality of data input/output pads, a plurality of on-die termination (ODT) circuits each including one or more resistors, a plurality of transceiver circuits each including one or more transmission drivers and one or more reception buffers, and a plurality of equalizer circuits each including one or more inductors. Each of the plurality of equalizer circuits is connected to one of the plurality of data input/output pads, one of the plurality of ODT circuits, and one of the plurality of transceiver circuits. The host device may be configured to drive each of the plurality of memory devices. Inductances of the one or more inductors included in each of the plurality of equalizer circuits have individual values which are based on resistance values of one or more resistors included in each of the plurality of ODT circuits. The resistance values of the one or more resistors included in each of the plurality of ODT circuits are determined based on a driver strength of the host device.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Figure 1:
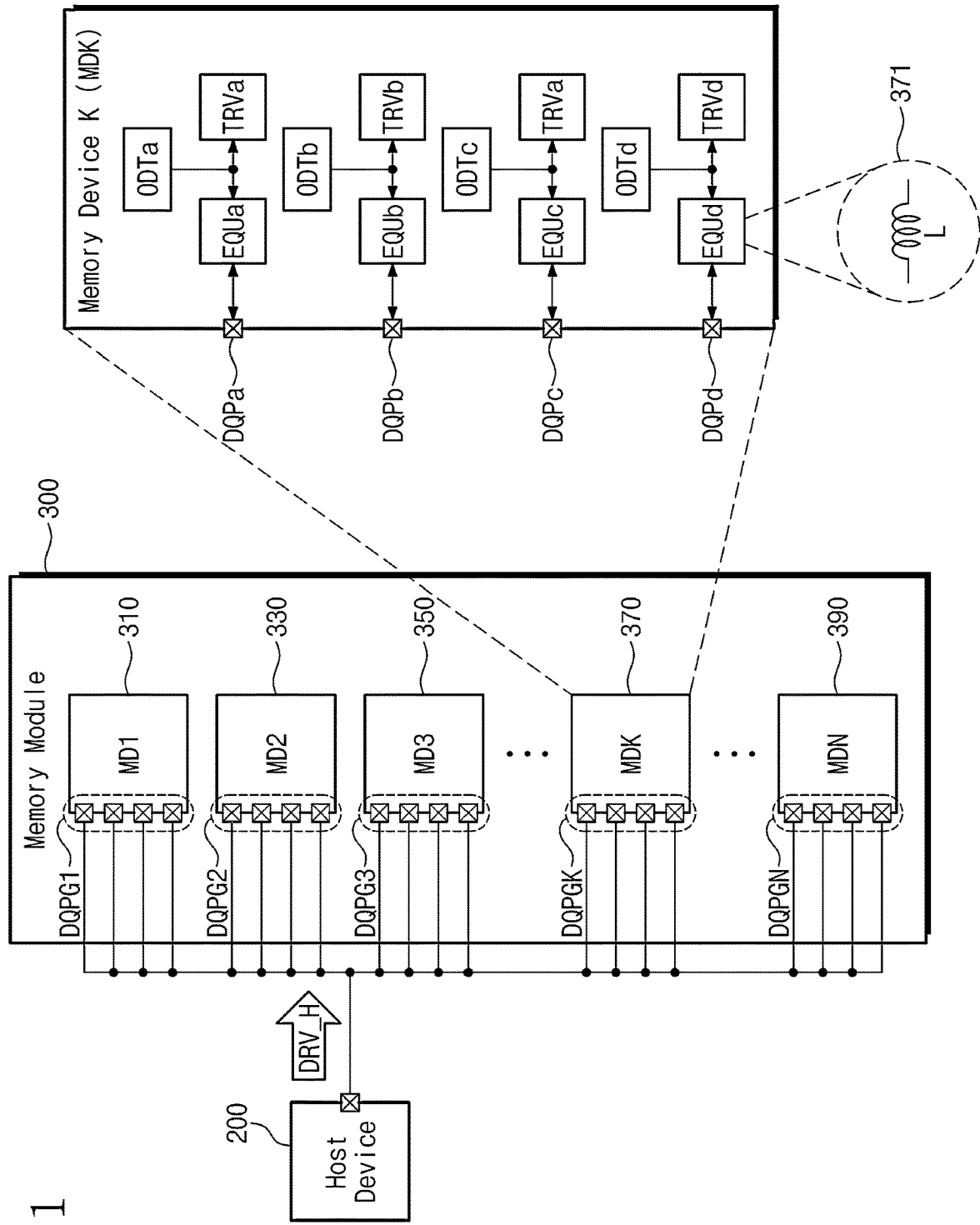
FIG. 1 is a block diagram illustrating a memory module according to an embodiment of the present disclosure.

FIG. 1 is a block diagram illustrating an electronic system including a memory module according to an embodiment of the present disclosure.

Referring to FIG. 1, an electronic system 100 may include a host device 200 and a memory module 300.

The host device 200 may overall control the electronic system 100. For example, the host device 200 may be an application processor (AP), a system-on-chip (SoC), an integrated circuit, etc. The host device 200 may transmit a request, an address, and data corresponding to the request to the memory module 300, and the memory module 300 may perform various operations based on the request and the data.

The memory module 300 may include a plurality of memory devices (MD1, MD2, MD3, . . . , MDK, . . . , and MDN) 310, 330, 350, 370, and 390 (K being an integer greater than 3 and N being an integer greater than K).

In an embodiment, the plurality of memory devices 310, 330, 350, 370, and 390 may be connected to interface channels for the communication with the host device 200 through a plurality of data input/output pad groups DQPG1, DQPG2, DQPG3, DQPGK, and DQPGN. The plurality of memory devices 310, 330, 350, 370, and 390 may receive the request, the address, and the data, which are transferred through the interface channels, through the plurality of data input/output pad groups DQPG1, DQPG2, DQPG3, DQPGK, and DQPGN.

Each of the plurality of memory devices 310, 330, 350, 370, and 390 may include a plurality of data input/output pads, a plurality of on-die termination (ODT) circuits, a plurality of transceiver circuits, and a plurality of equalizer circuits. Each equalizer circuit may be provided for each data input/output pad, may be provided for each ODT circuit, and may be provided for each transceiver circuit. For example, the number of equalizer circuits may be equal to the number of data input/output pads, may be equal to the number of ODT circuits, and may be equal to the number of transceiver circuits. For example, in each of the plurality of memory devices 310, 330, 350, 370, and 390, one equalizer circuit may be provided to correspond to each data input/output pad, one equalizer circuit may be provided to correspond to each ODT circuit, and one equalizer circuit may be provided to correspond to each transceiver circuit.

For example, each (e.g., 370) of the plurality of memory devices 310, 330, 350, 370, and 390 may include a plurality of data input/output pads (e.g., DQPa, DQPb, DQPc, and DQPd), a plurality of ODT circuits (e.g., ODTa, ODTb, ODTc, and ODTd), a plurality of transceiver circuits (e.g., TRVa, TRVb, TRVc, and TRVd), and a plurality of equalizer circuits (e.g., EQUa, EQUb, EQUc, and EQUd). For example, each (e.g., EQUa) of the plurality of equalizer circuits may be connected to one (e.g., DQPa) of the plurality of data input/output pads, one (e.g., ODTa) of the plurality of ODT circuits, and one (e.g., TRVa) of the plurality of transceiver circuits.

In an embodiment, the plurality of data input/output pads included in each (e.g., 370) of the plurality of memory devices 310, 330, 350, 370, and 390 may be included in one data input/output pad group, and each of the plurality of ODT circuits may perform impedance matching. For example, when a data signal that is transmitted through one of the plurality of data input/output pads and includes the data may be reflected as a noise signal at the end of the transmission line, the quality of the transmission line may be degraded; in this case, each of the plurality of ODT circuits may prevent the quality of the transmission line from being degraded.

In an embodiment, each of the plurality of transceiver circuits may include a transmission driver for transmitting a data signal and a reception buffer for receiving a data signal, and each of the plurality of equalizer circuits may compensate for the loss caused in the process of transmitting a data signal at a high speed.

In general, a common-source structure, a feedback structure, a common-gate structure, a band pass filter structure, a broadband noise removal technique, an inductive peaking technique, a current reuse technique, etc. may be used to expand the bandwidth of the transmission line. For example, in the memory module 300 according to an embodiment of the present disclosure, each of the plurality of equalizer circuits may expand a bandwidth of a data signal transmitted through the interface channel by employing the inductive peaking technique, and each of the plurality of equalizer circuits (e.g., EQUd) may include one or more inductors (e.g., 371).

Inductances of the one or more inductors included in each of the plurality of equalizer circuits may have individual values that are based on a driver strength DRV_H by the host device 200.

In an embodiment, the driver strength DRV_H by the host device 200 may indicate the strength with which the host device 200 drives one or more of the plurality of memory devices 310, 330, 350, 370, and 390 included in the memory module 300. For example, the host device 200 may include one or more transmission drivers, and the driver strength DRV_H by the host device 200 may indicate the strength with which the one or more transmission drivers included in the host device 200 drive one or more of the plurality of memory devices 310, 330, 350, 370, and 390. For example, the memory module 300 may include a plurality of memory ranks, and each of the plurality of memory ranks may include some of the plurality of memory devices 310, 330, 350, 370, and 390. In this case, for example, memory devices included in a first memory rank may be different from memory devices included in a second memory rank. When only some of the memory devices included in the plurality of memory ranks is activated in the write or read operation of the memory module 300, the driver strength DRV_H by the host device 200 may indicate the strength with which the one or more transmission drivers included in the host device 200 drive the activated memory devices. In an embodiment, when a transmission driver of the host device 200 drives one of the plurality memory devices 310, 330, 350, 370, and 390 with the driver strength DRV_H, the host device 200 may select a corresponding one of a plurality of reception buffers of the memory device. In this case, an inductance value of the inductor that is connected to the reception buffer may correspond to the driver strength DRV_H determined by the host device 200.

In an embodiment, the inductances of the one or more inductors included in each of the plurality of equalizer circuits may have individual values that are based on resistance values of a plurality of resistors included in the plurality of ODT circuits. In this case, the resistance values of the plurality of resistors may be determined based on the driver strength DRV_H by the host device 200.

In an embodiment, the plurality of memory devices 310, 330, 350, 370, and 390 may include one or more volatile memory devices or one or more nonvolatile memory devices. For example, the volatile memory devices may include a dynamic random access memory (DRAM) or a static RAM (SRAM). For example, the nonvolatile memory devices may include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), etc.

In an embodiment, the host device 200 and the memory module 300 may communicate with each other through an interface channel. For example, the interface channel may include one or more of interface channels based on DDR, DDR2, DDR3, DDR4, LPDDR (Low Power DDR), USB (Universal Serial Bus), MMC (Multimedia Card), embedded MMC, PCI (Peripheral Component Interconnection), PCI-e (PCI-express), ATA (Advanced Technology Attachment), Serial-ATA, Parallel-ATA, SCSI (Small Computer Small Interface), ESDI (Enhanced Small Disk Interface), IDE (Integrated Drive Electronics), Firewire, UFS (Universal Flash Storage), and NVMe (Nonvolatile Memory express).

According to the above configuration, a memory module and an electronic system of the present disclosure may include a plurality of memory devices each including a plurality of equalizer circuits. The plurality of equalizer circuits may utilize the inductive peaking technique and may compensate for the loss, which is capable of occurring in the process of transmitting a data signal at a high speed through an interface channel, by using one or more inductors.

The number of equalizer circuits may be equal to one of the number of data input/output pads, the number of ODT circuits, and the number of transceiver circuits. The inductances of the one or more inductors included in each of the plurality of equalizer circuits may have individual values that are based on a driver strength DRV_H by a host device. The plurality of equalizer circuits may efficiently increase the performance of an interface channel by using one or more inductors having inductance values appropriate for various operations of a memory module and may efficiently reduce the loss capable of occurring in an interface channel.

Figure 2:
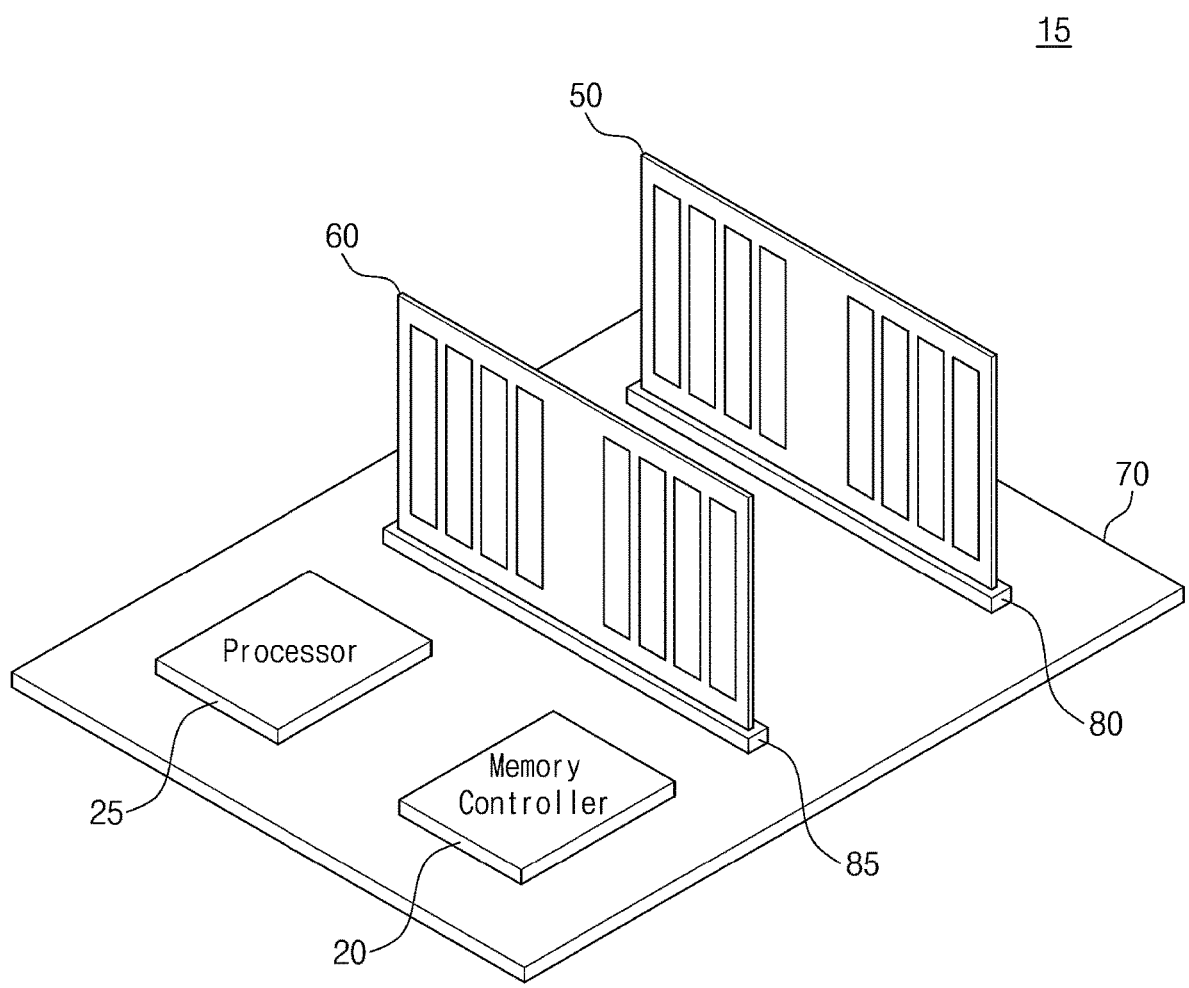
FIG. 2 is a block diagram illustrating an electronic system in which a memory module of FIG. 1 is mounted according to example embodiments.

FIG. 2 is a block diagram illustrating an electronic system in which a memory module of FIG. 1 is mounted according to example embodiments.

Referring to FIG. 2, an electronic system 15 may correspond to the electronic system 100 of FIG. 1. The electronic system 15 may include a memory controller 20, a processor 25, memory modules 50 and 60, a board 70, and sockets 80 and 85.

The memory controller 20, the processor 25, and the sockets 80 and 85 may be attached on the board 70 and may be electrically connected to each other through one or more conductive lines formed in the board 70. The memory module 50 may be mounted on the board 70 by the socket 80, and the memory module 60 may be mounted on the board 70 by the socket 85. The electronic system 15 may be a main board or a computing system in which the memory modules 50 and 60 are capable of being mounted, and the memory modules 50 and 60 may function as storage devices of the electronic system 15. The processor 25 may transmit a request, a logical address, and data to the memory controller 20, and the memory controller 20 may translate the request into a command, may translate the logical address into a physical address, and may transmit the command, the physical address, and the data to the memory modules 50 and 60. The memory controller 20 may transmit control signals including chip selection signals to the memory modules 50 and 60, and one or more of the memory modules 50 and 60 may be activated based on the control signals.

In an embodiment, the processor 25 and the memory controller 20 may correspond to the host device 200 of FIG. 1, and the memory modules 50 and 60 may correspond to the memory module 300 of FIG. 1. However, the present disclosure is not limited thereto.

Figure 3:
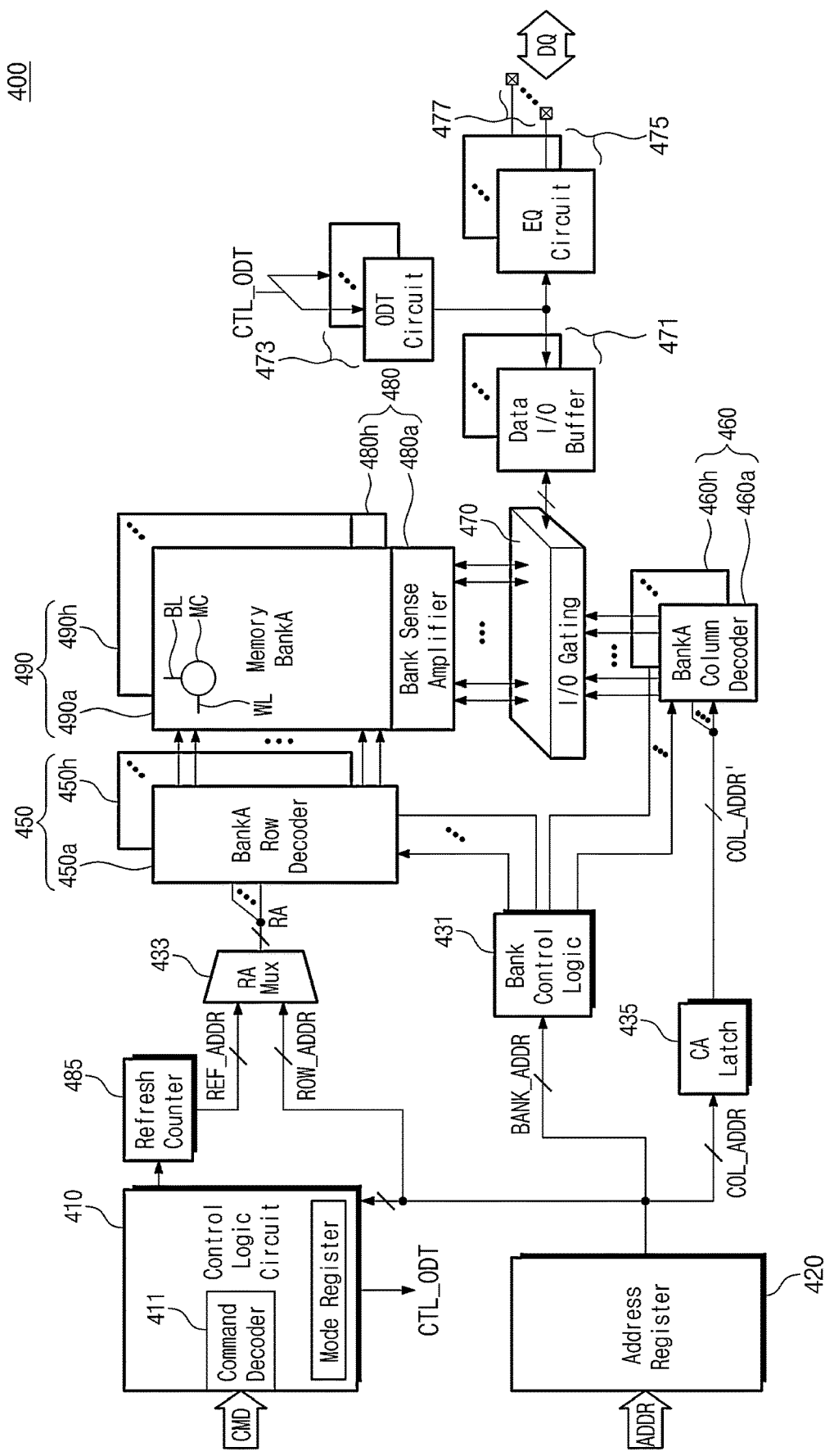
FIG. 3 is a block diagram illustrating an embodiment of one of a plurality of memory devices of FIG. 1 according to example embodiments.

FIG. 3 is a block diagram illustrating an embodiment of one of a plurality of memory devices of FIG. 1 according to example embodiments.

Referring to FIG. 3, a memory device 400 may include a control logic circuit 410, an address register 420, bank control logic 431, a row address multiplexer (RA Mux) 433, a column address (CA) latch 435, a row decoder 450, a column decoder 460, a memory cell array 490, an input/output (I/O) gating circuit 470, a data input/output buffer 471, an ODT circuit 473, an equalizer (EQ) circuit 475, data input/output pads 477, a sense amplifier circuit 480, and a refresh counter 485.

The memory cell array 490 may include first to eighth memory banks 490a to 490h. The row decoder 450 may include first to eighth bank row decoders 450a to 450h respectively connected to the first to eighth memory banks 490a to 490h, the column decoder 460 may include first to eighth bank column decoders 460a to 460h respectively connected to the first to eighth memory banks 490a to 490h, and the sense amplifier circuit 480 may include first to eighth bank sense amplifiers 480a to 480h respectively connected to the first to eighth memory banks 490a to 490h.

The first to eighth memory banks 490a to 490h, the first to eighth bank sense amplifiers 480a to 480h, the first to eighth bank row decoders 450a to 450h, and the first to eighth bank column decoders 460a to 460h may constitute first to eighth banks. Each of the first to eighth memory banks 490a to 490h may include a plurality of word lines WLs, a plurality of bit lines BLs, and a plurality of memory cells MC formed at intersections of the word lines WLs and the bit lines BLs.

An example of the memory device 400 including 8 banks is illustrated in FIG. 3. However, in other embodiments, the memory device 400 may include banks, the number of which is 2 or more.

The address register 420 may receive an address ADDR including a bank address BANK_ADDR, a row address ROW_ADDR, and a column address COL_ADDR from a memory controller (e.g., 200 of FIG. 1 or 20 of FIG. 2). The address register 420 may provide the received bank address BANK_ADDR to the bank control logic 431, may provide the received row address ROW_ADDR to the row address multiplexer 433, and may provide the received column address COL_ADDR to the column address latch 435.

The bank control logic 431 may generate bank control signals in response to the bank address BANK_ADDR. A bank row decoder corresponding to the bank address BANK_ADDR from among the first to eighth bank row decoders 450a to 450h may be activated in response to the bank control signals, and a bank column decoder corresponding to the bank address BANK_ADDR from among the first to eighth bank column decoders 460a to 460h may be activated in response to the bank control signals.

The row address multiplexer 433 may receive the row address ROW_ADDR from the address register 420 and may receive a refresh row address REF_ADDR from the refresh counter 490. The row address multiplexer 433 may selectively output the row address ROW_ADDR or the refresh row address REF_ADDR as a row address RA. The row address RA output from the row address multiplexer 433 may be applied to each of the first to eighth bank row decoders 450a to 450h.

A bank row decoder activated by the bank control logic 431 from among the first to eighth bank row decoders 450a to 450h may decode the row address RA output from the row address multiplexer 433 and may activate a word line corresponding to the row address RA. For example, the activated bank row decoder may apply a word line driving voltage to the word line corresponding to the row address RA. The activated bank row decoder may generate the word line driving voltage by using a power supply voltage and may provide the word line driving voltage to the corresponding word line.

The column address latch 435 may receive the column address COL_ADDR from the address register 420 and may temporarily store the received column address COL_ADDR. Also, in a burst mode, the column address latch 435 may gradually (or sequentially) increase the received column address COL_ADDR. The column address latch 435 may apply the temporarily stored column address COL_ADDR' or the gradually increased column address COL_ADDR' to each of the first to eighth bank column decoders 460a to 460h.

A bank column decoder activated by the bank control logic 431 from among the first to eighth bank column decoders 460a to 460h may activate a sense amplifier corresponding to the bank address BANK_ADDR and the column address COL_ADDR through the input/output gating circuit 470.

The input/output gating circuit 470 may include the following together with circuits gating input/output data: input data mask logic, read data latches for storing data output from the first to eighth memory banks 490a to 490h, and write drivers for writing data in the first to eighth memory banks 490a to 490h.

Data read from one memory bank among the first to eighth memory banks 490a to 490h may be sensed by a sense amplifier corresponding to the one memory bank and may be latched by the read data latches.

The data stored in the read data latches may be provided to the memory controller through the data input/output buffer 471, the equalizer circuit 475, and the data input/output pads 477. Data DQ to be written in one memory bank among the first to eighth memory banks 490a to 490h may be provided to the data input/output buffer 471 from the memory controller through the data input/output pads 477 and the equalizer circuit 475. The data DQ provided to the data input/output buffer 471 may be provided to the input/output gating circuit 470.

The control logic circuit 410 may control the operation of the memory device 400. For example, the control logic circuit 410 may generate control signals such that the memory device 400 performs a write operation or a read operation. The control logic circuit 410 may include a command decoder 411 that decodes the command CMD received from the memory controller and a mode register 413 for setting an operation mode of the memory device 400.

In an embodiment, the control logic circuit 410 may output a control signal CTL_ODT for controlling the ODT circuit 473, and the ODT circuit 473 may turn on/turn off one or more switches capable of being included within the ODT circuit 473, based on the control signal CTL_ODT.

In an embodiment, the memory device 400 may correspond to one of the plurality of memory devices 310, 330, 350, . . . , 370, . . . , and 390 of FIG. 1, the data input/output buffer 471 may correspond to all the transceiver circuits TRVa, TRVb, TRVc, and TRVd of FIG. 1, the ODT circuit 473 may correspond to the plurality of ODT circuits ODTa, ODTb, ODTc, and ODTd of FIG. 1, the equalizer circuit 475 may correspond to all the equalizer circuits EQUa, EQUb, EQUc, and EQUd of FIG. 1, and the data input/output pads 477 may correspond to all the data input/output pads DQPa, DQPb, DQPc, and DQPd of FIG. 1.

Figure 4:
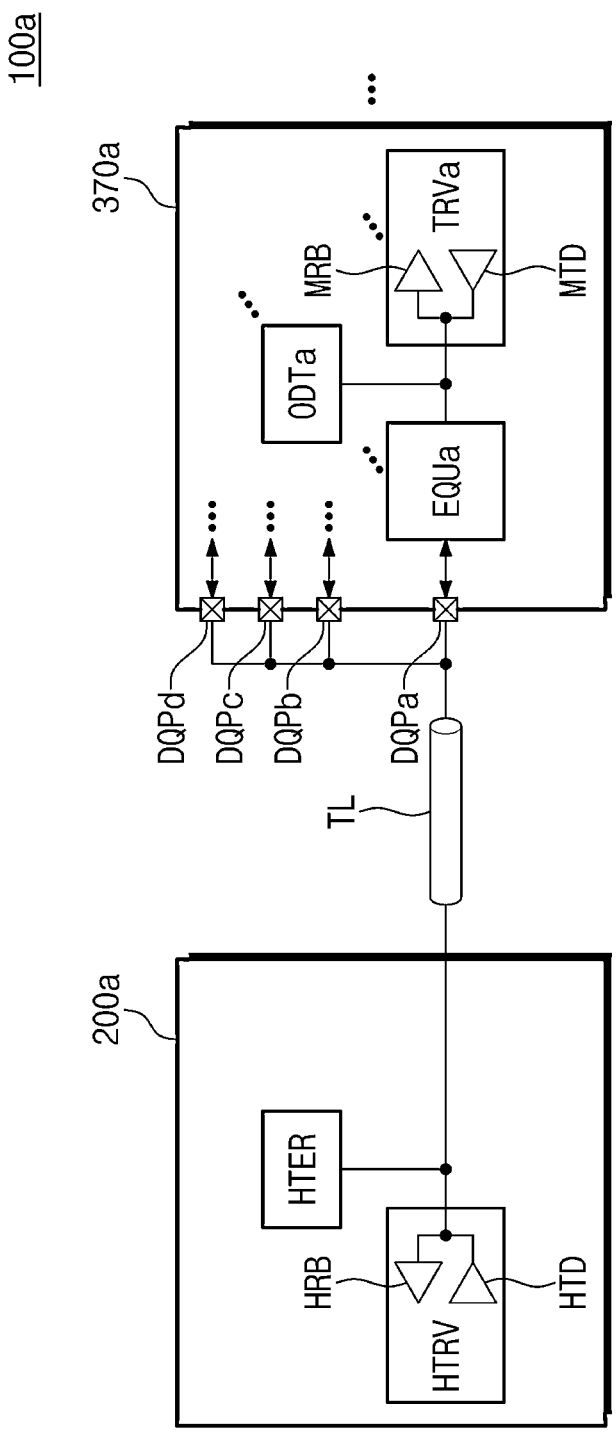
FIG. 4 is a diagram for describing a driver strength by a host device of FIG. 1 according to example embodiments.

FIG. 4 is a diagram for describing a driver strength by the host device of FIG. 1 according to example embodiments.

Referring to FIG. 4, an electronic system 100a may include a host device 200a and a memory device 370a. The electronic system 100a, the host device 200a, and the memory device 370a may respectively correspond to the electronic system 100, the host device 200, and the memory device 370 of FIG. 1.

The host device 200a may include a host-side transceiver circuit HTRV and a host-side termination circuit HTER, and the host-side transceiver circuit HTRV may include a host-side transmission driver HTD and a host-side reception buffer HRB.

The memory device 370a may include the plurality of data input/output pads DQPa, DQPb, DQPc, and DQPd and may include the ODT circuit ODTa, the equalizer circuit EQUa, and the transceiver circuit TRVa connected to the data input/output pad DQPa; as in the host-side transceiver circuit HTRV, the transceiver circuit TRVa may include a transmission driver MTD and a reception buffer MRB. One ODT circuit ODTa, one equalizer circuit EQUa, one transceiver circuit TRVa connected to one data input/output pad (e.g., DQPa) are only illustrated in FIG. 4, but an ODT circuit, an equalizer circuit, and a transceiver circuit may be connected to each of the remaining data input/output pads (e.g., DQPb, DQPc, and DQPd) in the same manner as the data input/output pad DQPa.

As described with reference to FIG. 1, the driver strength by the host device 200a may indicate the strength with which the host device 200a drives one or more of a plurality of memory devices included in a memory module. In an embodiment, the host device 200a may include the host-side transmission driver HTD, and the driver strength by the host device 200a may indicate the strength with which the host-side transmission driver HTD drives one or more of the plurality of memory devices. In this case, the driver strength may be individually determined based on the hardware requirements of users using the plurality of memory devices, and the magnitude of current consumption, a slew rate, a noise characteristic, etc. may be variously changed depending on a change in the driver strength in the process of transmitting data signals from the host device 200a to the memory device 370a through a transmission line TL corresponding to an interface channel.

Figure 5:
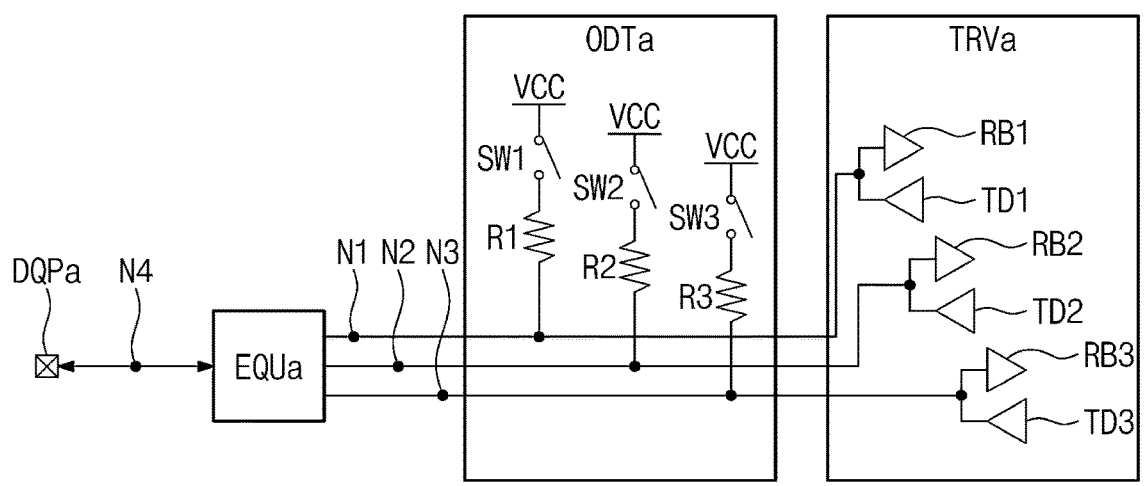
FIG. 5 is a diagram for describing an embodiment of a connection relationship between a data input/output pad, an on-die termination (ODT) circuit, a transceiver circuit, and an equalizer circuit of FIG. 1, according to example embodiments.

FIG. 5 is a diagram for describing an embodiment of a connection relationship between a data input/output pad, an on-die termination (ODT) circuit, a transceiver circuit, and an equalizer circuit of FIG. 1, according to example embodiments.

Referring to FIGS. 1, 4, and 5, the memory device 370a may include the data input/output pad DQPa, the equalizer circuit EQUa, the ODT circuit ODTa, and the transceiver circuit TRVa. The equalizer circuit EQUa may be connected to the ODT circuit ODTa, the transceiver circuit TRVa, and the data input/output pad DQPa through nodes N1, N2, N3, and N4.

In an embodiment, the equalizer circuit EQUa may be connected to the ODT circuit ODTa and the transceiver circuit TRVa through the nodes N1, N2, and N3 and may be connected to the data input/output pad DQPa through the node N4.

For example, the equalizer circuit EQUa may include a plurality of inductors. The ODT circuit ODTa may include a plurality of resistors (e.g., R1, R2, and R3) and a plurality of switches (e.g., SW1, SW2, and SW3). The transceiver circuit TRVa may include a plurality of transmission drivers (or, transmission buffers) TD1, TD2, and TD3 and a plurality of reception buffers RB1, RB2, and RB3. For example, the plurality of resistors of the ODT circuit ODTa may be respectively connected in series with the plurality of switches, and the equalizer circuit EQUa may be connected to the resistor R1 through the node N1, may be connected to the resistor R2 through the node N2, and may be connected to the resistor R3 through the node N3. For example, the equalizer circuit EQUa may be connected to the transmission driver TD1 and the reception buffer RB1 through the node N1, may be connected to the transmission driver TD2 and the reception buffer R32 through the node N2, and may be connected to the transmission driver TD3 and the reception buffer RB3 through the node N3.

In an embodiment, the host device 200 may drive the memory device 370a based on the driver strength DRV_H. For example, the host device 200 may select one of the reception buffers RB1 to R33 based on the driver strength DRV_H. In this case, the host device 200 may drive the selected one of the reception buffers RB1 to R33 through the data input/output pad DQPa and the equalizer circuit EQUa.

In an embodiment, the memory device 370a may drive the host device 200 based on the driver strength DRV_H. For example, the host device 200 may select one of the transmission drivers TD1 to TD3 based on the driver strength DRV_H. In this case, the selected one of the transmission drivers TD1 to TD3 may drive the host device 200 through the equalizer circuit EQUa and the data input/output pad DQPa.

An example in which the ODT circuit ODTa includes three resistors and the transceiver circuit TRVa includes three transmission drivers and three reception buffers is illustrated in FIG. 5, but the number of resistors included in the ODT circuit ODTa, the number of transmission drivers included in the transceiver circuit TRVa, and the number of reception buffers included in the transceiver circuit TRVa are provided only as an example.

The ODT circuit ODTa and the transceiver circuit TRVa are illustrated in FIG. 5 independently of each other, but the ODT circuit ODTa may be included in the transceiver circuit TRVa. In an embodiment, the transceiver circuit TRVa may include a plurality of transmission buffers and a plurality of reception buffers. The plurality of transmission buffers may operate as a plurality of ODT circuits in the write operation of a memory device and may operate as a plurality of transmission drivers in the read operation of the memory device. For example, the plurality of transmission buffers may operate as a plurality of resistors in the write operation of the memory device.

Figure 6A:
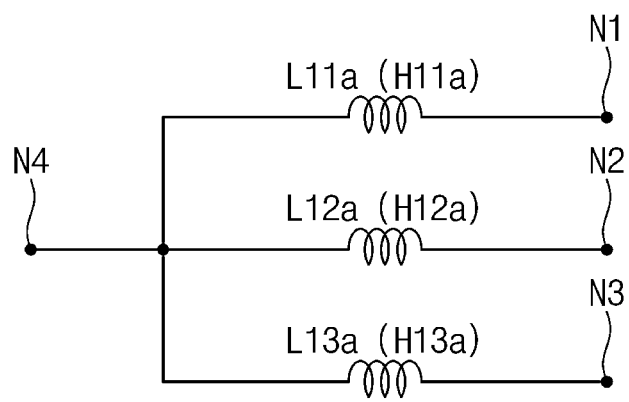
FIGS. 6A, 6B, and 6C are diagrams for describing an embodiment of an equalizer circuit of FIG. 5 according to example embodiments.
Figure 6B:
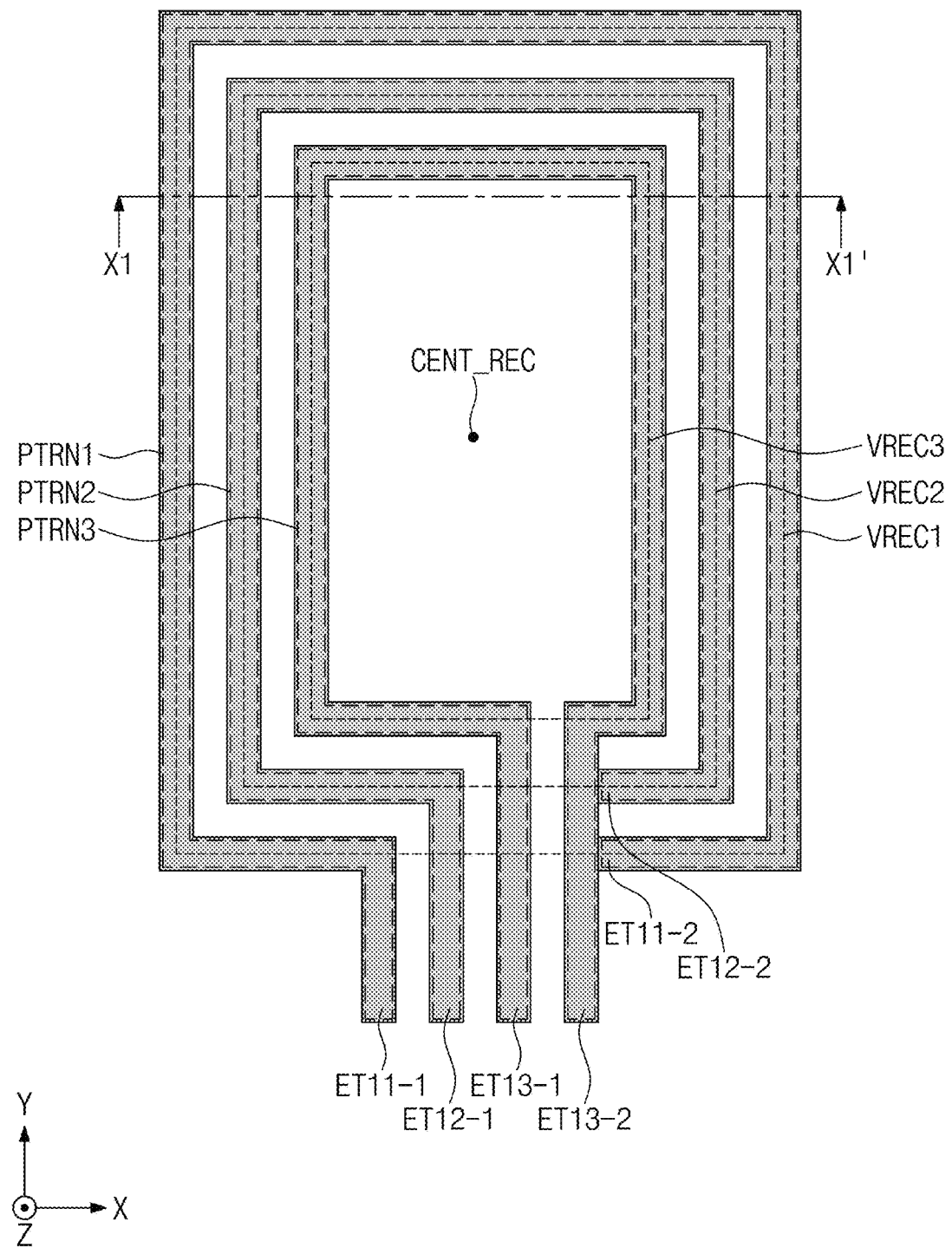
Figure 6C:
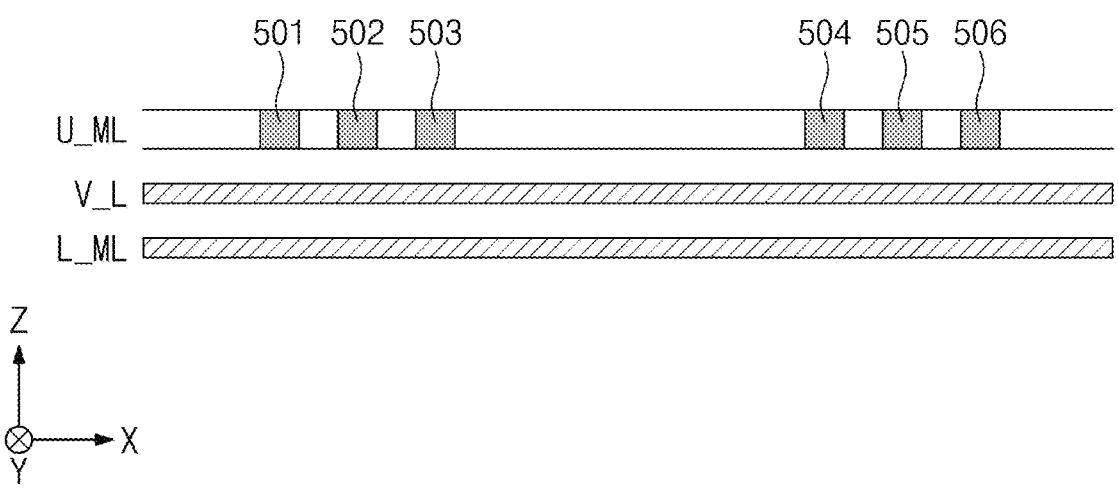

FIGS. 6A, 6B, and 6C are diagrams for describing an embodiment of an equalizer circuit of FIG. 5 according to example embodiments.

Referring to FIGS. 5 and 6A, an equalizer circuit EQUa-1 may correspond to the equalizer circuit EQUa of FIG. 5.

The equalizer circuit EQUa-1 may include a plurality of inductors L11a, L12a, and L13a, and the plurality of inductors L11a, L12a, and L13a may respectively have inductances H11a, H12a, and H13a.

In an embodiment, a first end of each of the plurality of inductors L11a, L12a, and L13a may be connected to the node N4, and a second end of each of the plurality of inductors Lila, L12a, and L13a may be connected to one of the plurality of resistors R1, R2, and R3 included in the ODT circuit ODTa. For example, the inductor L11a may be connected between the node N1 to which the resistor R1 is connected and the data input/output pad DQPa, the inductor L12a may be connected between the node N2 to which the resistor R2 is connected and the data input/output pad DQPa, and the inductor L13a may be connected between the node N3 to which the resistor R3 is connected and the data input/output pad DQPa.

In an embodiment, the number of the plurality of inductors L11a, L12a, and L13a may be equal to the number of the plurality of resistors R1, R2, and R3 included in the ODT circuit ODTa.

In an embodiment, an inductance value of one of the plurality of inductors L11a, L12a, and L13a may be determined based on a resistance value of one of the plurality of resistors R1, R2, and R3. For example, an inductance value of one of the plurality of inductors L11a, L12a, and L13a may be proportional to the square of a resistance value of one of the plurality of resistors R1, R2, and R3. For example, a value of the inductance H11a of the inductor L11a may be proportional to the square of the resistance value of the resistor R1, a value of the inductance H12a of the inductor L12a may be proportional to the square of the resistance value of the resistor R2, and a value of the inductance H13a of the inductor L13a may be proportional to the square of the resistance value of the resistor R3.

In an embodiment, when the host device 200 drives the memory device 370a based on the driver strength DRV_H, the host device 200 may select one of the reception buffers RB1 to RB3 based on the driver strength DRV_H. For example, the host device 200 may drive the selected one of the reception buffers RB1 to RB3 through the data input/output pad DQPa and a selected one of the plurality of inductors L11a, L12a, and L13a connected to the selected one of the reception buffers RB1 to RB3.

In an embodiment, when the memory device 370a drives the host device 200 based on the driver strength DRV_H, the host device 200 may select one of the transmission drivers TD1 to TD3 based on the driver strength DRV_H. For example, the selected one of the transmission drivers TD1 to TD3 may drive the host device 200 through a selected one of the plurality of inductors L11a, L12a, and L13a connected to the selected one of the transmission drivers TD1 to TD3 and the data input/output pad DQPa.

In FIGS. 6B and 6C, a plurality of patterns PTRN1, PTRN2, and PTRN3 are illustrated based on directions X, Y, and Z crossing at the right angles. Each of the directions X and Y may be referred to as a "horizontal direction", and the direction Z may be referred to as a "vertical direction".

Referring to FIGS. 5, 6A, and 6B, the plurality of inductors L11a, L12a, and L13a included in the equalizer circuit EQUa-1 may be formed in a single metal layer on a substrate as the plurality of patterns PTRN1, PTRN2, and PTRN3, and portions of the plurality of patterns PTRN1, PTRN2, and PTRN3 may be included in the single metal layer and may be formed on virtual concentric rectangles VREC1, VREC2, and VREC3 sharing a virtual center of gravity CENT_REC.

In an embodiment, the value of the inductance H11a of the inductor L11a may be greater than the value of the inductance H12a of the inductor L12a, and the value of the inductance H12a of the inductor L12a may be greater than the value of the inductance H13a of the inductor L13a. In this case, the inductor L11a may be formed as the pattern PTRN1 among the plurality of patterns PTRN1, PTRN2, and PTRN3, the inductor L12a may be formed as the pattern PTRN2 among the plurality of patterns PTRN1, PTRN2, and PTRN3, and the inductor L13a may be formed as the pattern PTRN3 among the plurality of patterns PTRN1, PTRN2, and PTRN3. For example, the plurality of patterns PTRN1, PTRN2, and PTRN3 may include a first pattern, a second pattern, and a third pattern, and the plurality of inductors L11a, L12a, and L13a may include a first inductor formed as the first pattern, a second inductor formed as the second pattern, and a third inductor formed as the third pattern. A value of an inductance of the first inductor may be greater than a value of an inductance of the second inductor, and the value of the inductance of the second inductor may be greater than a value of an inductance of the third inductor. The first pattern may be formed to be closer to the outside than the second pattern, and the second pattern may be formed to be closer to the outside than the third pattern on the virtual concentric rectangles VREC1, VREC2, and VREC3.

In an embodiment, the pattern PTRN1 may include ends ET11-1 and ET11-2, the pattern PTRN2 may include ends ET12-1 and ET12-2, and the pattern PTRN3 may include distal ends ET13-1 and ET13-2. For example, the pattern PTRN1 may start from the distal end ET11-1, may extend in the +Y direction to then extend in the −X direction, may again extend in the +Y direction to then extend in the +X direction, may extend in the −Y direction to then extend in the −X direction, and may end at the distal end ET11-2. For example, each of the patterns PTRN2 and PTRN3 may be similar in shape to the pattern PTRN1, the pattern PTRN2 may start from the distal end ET12-1 and may end at the distal end ET12-2, and the pattern PTRN3 may start from the distal end ET13-1 and may end at the distal end ET13-2.

In an embodiment, the distal ends ET11-1, ET12-1, ET13-1, and ET13-2 may correspond to the nodes N1, N2, N3, and N4. For example, the distal end ET11-1 may correspond to the node N1, the distal end ET12-1 may correspond to the node N2, the distal end ET13-1 may correspond to the node N3, and the distal end ET13-2 may correspond to the node N4.

Referring to FIGS. 5, 6A, 6B, and 6C, FIG. 6C is a cross-sectional view taken along line X1-X1' of FIG. 6B in the vertical direction, and the plurality of patterns PTRN1, PTRN2, and PTRN3 described with reference to FIG. 6B may be expressed in the single metal layer by using shapes 501, 502, 503, 504, 505, and 506.

In an embodiment, a plurality of metal layers U_ML, V_L, and L_ML may be formed on the substrate, and insulating layers are disposed between the metal layer U_ML and the metal layer V_L and between the metal layer V_L and the metal layer L_ML in the vertical direction. The plurality of patterns PTRN1, PTRN2, and PTRN3 may be formed in the single metal layer U_ML. However, the present disclosure is not limited thereto.

Figure 7A:
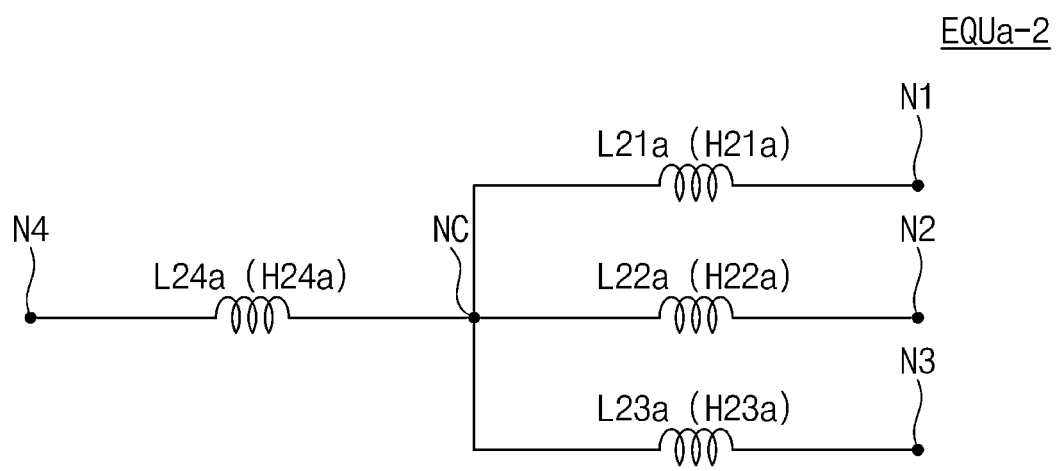
FIGS. 7A, 7B, and 7C are diagrams for describing an embodiment of an equalizer circuit of FIG. 5 according to example embodiments.
Figure 7B:
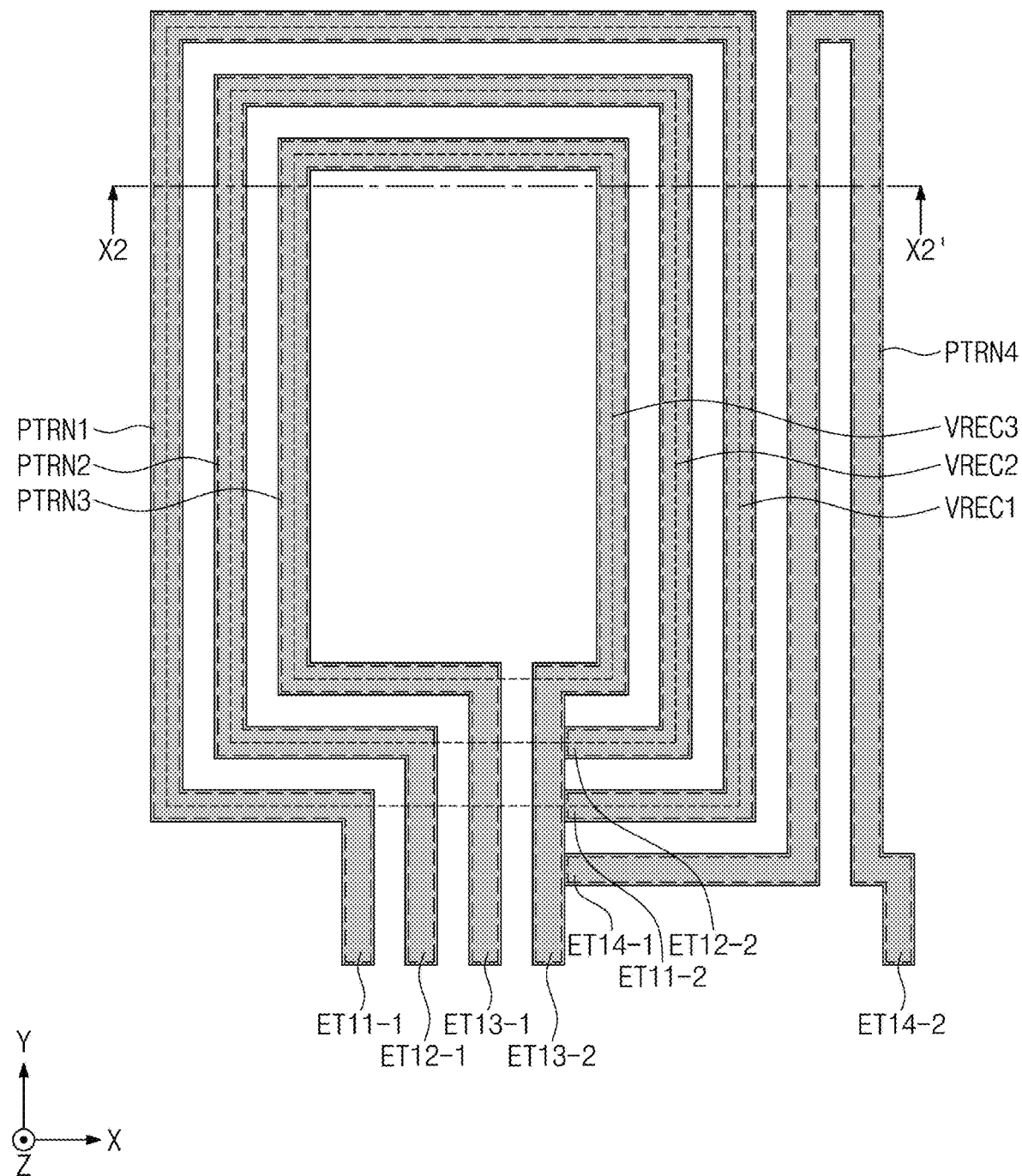
Figure 7C:
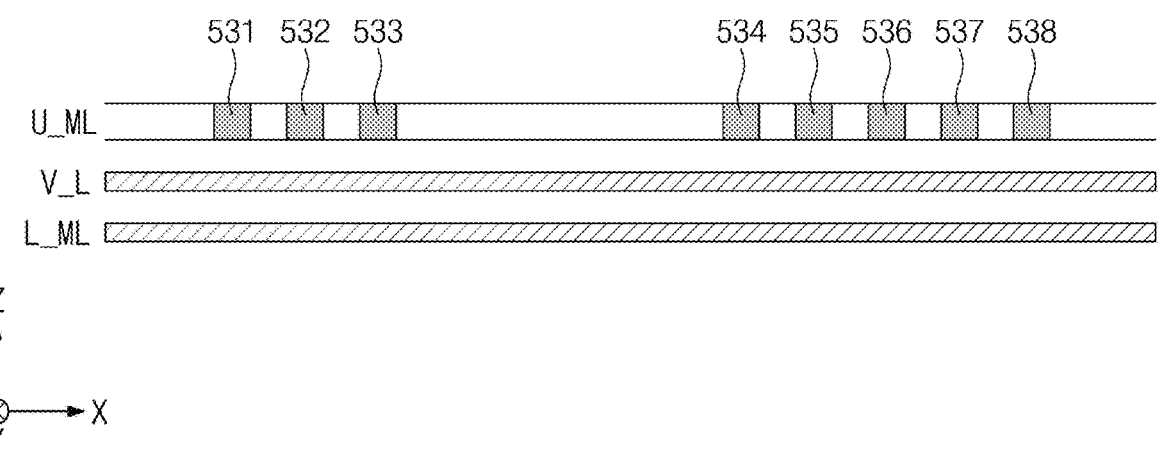

FIGS. 7A, 7B, and 7C are diagrams for describing an embodiment of an equalizer circuit of FIG. 5 according to example embodiments.

Referring to FIGS. 5 and 7A, an equalizer circuit EQUa-2 may correspond to the equalizer circuit EQUa of FIG. 5.

The equalizer circuit EQUa-2 may include a plurality of inductors L21a, L22a, L23a, and L24a, and the plurality of inductors L21a, L22a, L23a, and L24a may respectively have inductances H21a, H22a, H23a, and H24a.

In an embodiment, a first end of one (e.g., L24a) of the plurality of inductors L21a, L22a, L23a, and L24a may be connected to the node N4, and a second end thereof may be connected to a node NC. A first end of each of the remaining inductors (e.g., L21a, L22a, and L23a) among the plurality of inductors L21a, L22a, L23a, and L24a may be connected to the node NC, and a second end thereof may be connected to one of the plurality of resistors R1, R2, and R3. For example, the inductor L21a may be connected between the node N1 to which the resistor R1 is connected and the node NC, the inductor L22a may be connected between the node N2 to which the resistor R2 is connected and the node NC, and the inductor L23a may be connected between the node N3 to which the resistor R3 is connected and the node NC.

In an embodiment, the number of resistors (e.g., R1, R2, and R3) included in the ODT circuit ODTa may be "X" (X being an integer of 2 or more), and the number of inductors (e.g., L21a, L22a, L23a, and L24a) may be (X+1).

In an embodiment, an inductance value of one of the remaining inductors L21a, L22a, and L23a other than the inductor L24a connected to the node N4 from among the plurality of inductors L21a, L22a, L23a, and L24a may be determined based on a resistance value of one of the plurality of resistors R1, R2, and R3. For example, an inductance value of one of the inductors L21a, L22a, and L23a may be proportional to the square of a resistance value of one of the plurality of resistors R1, R2, and R3. For example, a value of the inductance H21a of the inductor L21a may be proportional to the square of the resistance value of the resistor R1, a value of the inductance H22a of the inductor L22a may be proportional to the square of the resistance value of the resistor R2, and a value of the inductance H23a of the inductor L23a may be proportional to the square of the resistance value of the resistor R3.

In FIGS. 7B and 7C, a plurality of patterns PTRN1, PTRN2, PTRN3, and PTRN4 are illustrated based on the directions X, Y, and Z crossing at the right angles. Each of the directions X and Y may be referred to as a "horizontal direction", and the direction Z may be referred to as a "vertical direction".

Referring to FIGS. 5, 7A, and 7B, the plurality of inductors L21a, L22a, L23a, and L24a included in the equalizer circuit EQUa-2 may be formed in a single metal layer on a substrate as the plurality of patterns PTRN1, PTRN2, PTRN3, and PTRN4, portions of the patterns PTRN1, PTRN2, and PTRN3 among the plurality of patterns PTRN1, PTRN2, PTRN3, and PTRN4 may be included in the single metal layer and may be formed on virtual concentric rectangles VREC1, VREC2, and VREC3 sharing the virtual center of gravity. The patterns PTRN1, PTRN2, and PTRN3 may be identical or similar in shape to the patterns PTRN1, PTRN2, and PTRN3 described with reference to FIG. 6B, and thus, additional description will be omitted to avoid redundancy.

In an embodiment, the pattern PTRN1 may include distal ends ET11-1 and ET11-2, and the pattern PTRN2 may include distal ends ET12-1 and ET12-2. The pattern PTRN3 may include distal ends ET13-1 and ET13-2, and the pattern PTRN4 may include distal ends ET14-1 and ET14-2. For example, the pattern PTRN1 may start from the distal end ET11-1, may extend in the +Y direction to then extend in the −X direction, may again extend in the +Y direction to then extend in the +X direction, may extend in the −Y direction to then extend in the −X direction, and may end at the distal end ET11-2. For example, each of the patterns PTRN2 and PTRN3 may be similar in shape to the pattern PTRN1, the pattern PTRN2 may start from the distal end ET12-1 and may end at the distal end ET12-2, and the pattern PTRN3 may start from the distal end ET13-1 and may end at the distal end ET13-2. The pattern PTRN4 may start from the distal end ET14-1, may extend in the +X direction to then extend in the +Y direction, may again extend in the +X direction to then extend in the −Y direction, may again extend in the +X direction to then extend in the −Y direction, and may end at the distal end ET14-2.

In an embodiment, the distal ends ET11-1, ET12-1, ET13-1, ET13-2, and ET14-2 may correspond to the nodes N1, N2, N3, NC, and N4. For example, the distal end ET11-1 may correspond to the node N1, the distal end ET12-1 may correspond to the node N2, the distal end ET13-1 may correspond to the node N3, the distal end ET13-2 may correspond to the node NC, and the distal end ET14-2 may correspond to the node N4.

Referring to FIGS. 5, 7A, 7B, and 7C, FIG. 7C is a cross-sectional view taken along line X2-X2' of FIG. 7B in the vertical direction, and the plurality of patterns PTRN1, PTRN2, PTRN3, and PTRN4 described with reference to FIG. 7B may be expressed in the single metal layer by using shapes 531, 532, 533, 534, 535, 536, 537, and 538.

In an embodiment, the plurality of metal layers U_ML, V_L, and L_ML may be formed on the substrate, and the plurality of patterns PTRN1, PTRN2, PTRN3, and PTRN4 may be formed in the single metal layer U_ML. However, the present disclosure is not limited thereto.

Figure 8:
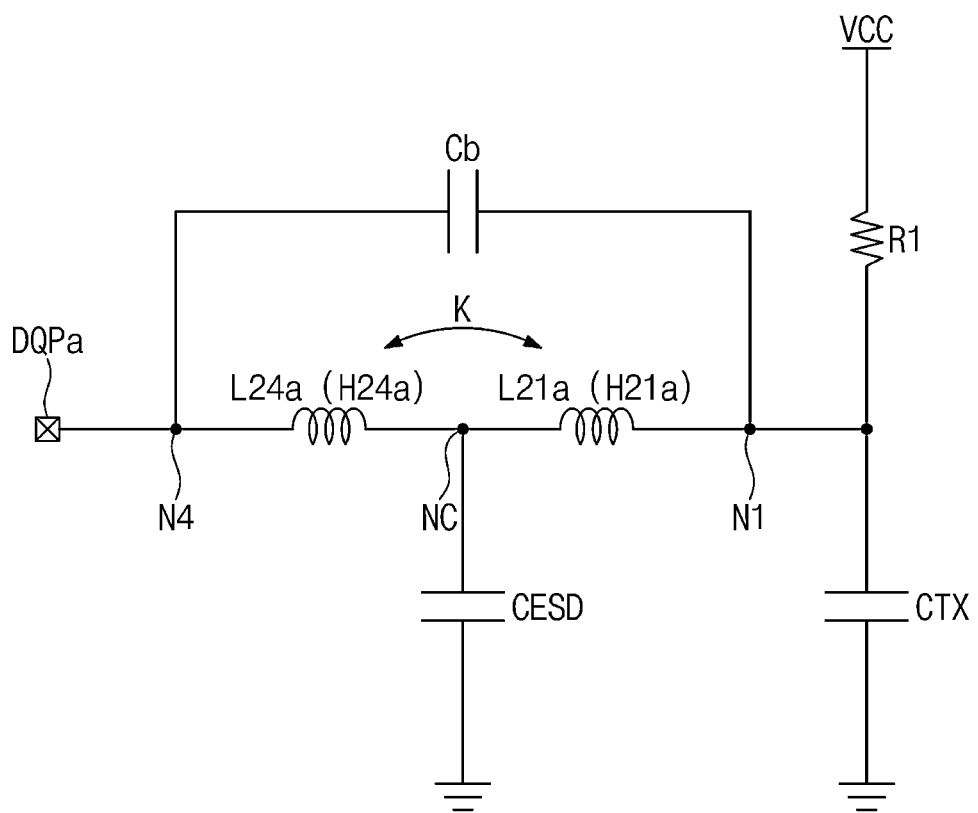
FIG. 8 is a diagram for describing inductance values of inductors included in an equalizer circuit of FIG. 5 according to example embodiments.

FIG. 8 is a diagram for describing inductance values of inductors included in an equalizer circuit of FIG. 5 according to example embodiments.

An equivalent circuit including some of a plurality of inductors described with reference to FIGS. 5 and 7A is illustrated in FIG. 8. For example, the equivalent circuit illustrated in FIG. 8 may include the inductors L24a and L21a connected between the nodes N1 and N4, may include the resistor R1 included in the ODT circuit ODTa of FIG. 5 and connected to the node N1, and may include the data input/output pad DQPa connected to the node N4.

Referring to FIGS. 5 and 8, the inductors L24a and L21a may form a T-coil, and the equivalent circuit of FIG. 8 may further include a bridge capacitor Cb capable of being formed by the T-coil, an electrostatic discharge (ESD) capacitor CESD for ESD prevention, and a transmission capacitor CTX obtained by modeling a capacitance of a transceiver circuit side. For example, the bridge capacitor Cb may be connected between the nodes N1 and N4, and the ESD capacitor CESD may be connected between the node NC and a ground voltage, and the transmission capacitor CTX may be connected between the node N1 and the ground voltage. The inductors L24a and L21a may be magnetically coupled as much as a coupling coefficient K.

In an embodiment, as described with reference to FIG. 7A, the value of the inductance H21a of the inductor L21a may be proportional to the square of the resistance value of the resistor R1. For example, the value of the inductance H21a of the inductor L21a may be proportional to a capacitance value of the ESD capacitor CESD, may be proportional to the square of the resistance value of the resistor R1, and may be proportional to a value obtained by multiplying the capacitance value of the ESD capacitor CESD and the square of the resistance value of the resistor R1 together.

In an embodiment, as in the above value of the inductance H21a of the inductor L21a, a value of each of the inductances H22a and H23a of the inductors L22a and L23a may be proportional to the capacitance value of the ESD capacitor CESD and the square of a resistance value of a relevant resistor, and each of the inductances H11a, H12a, and H13a of the inductors L11a, L12a, and L13a may also have given relationships with a resistance value of a relevant resistor as described with reference to FIG. 6A.

Figure 9:
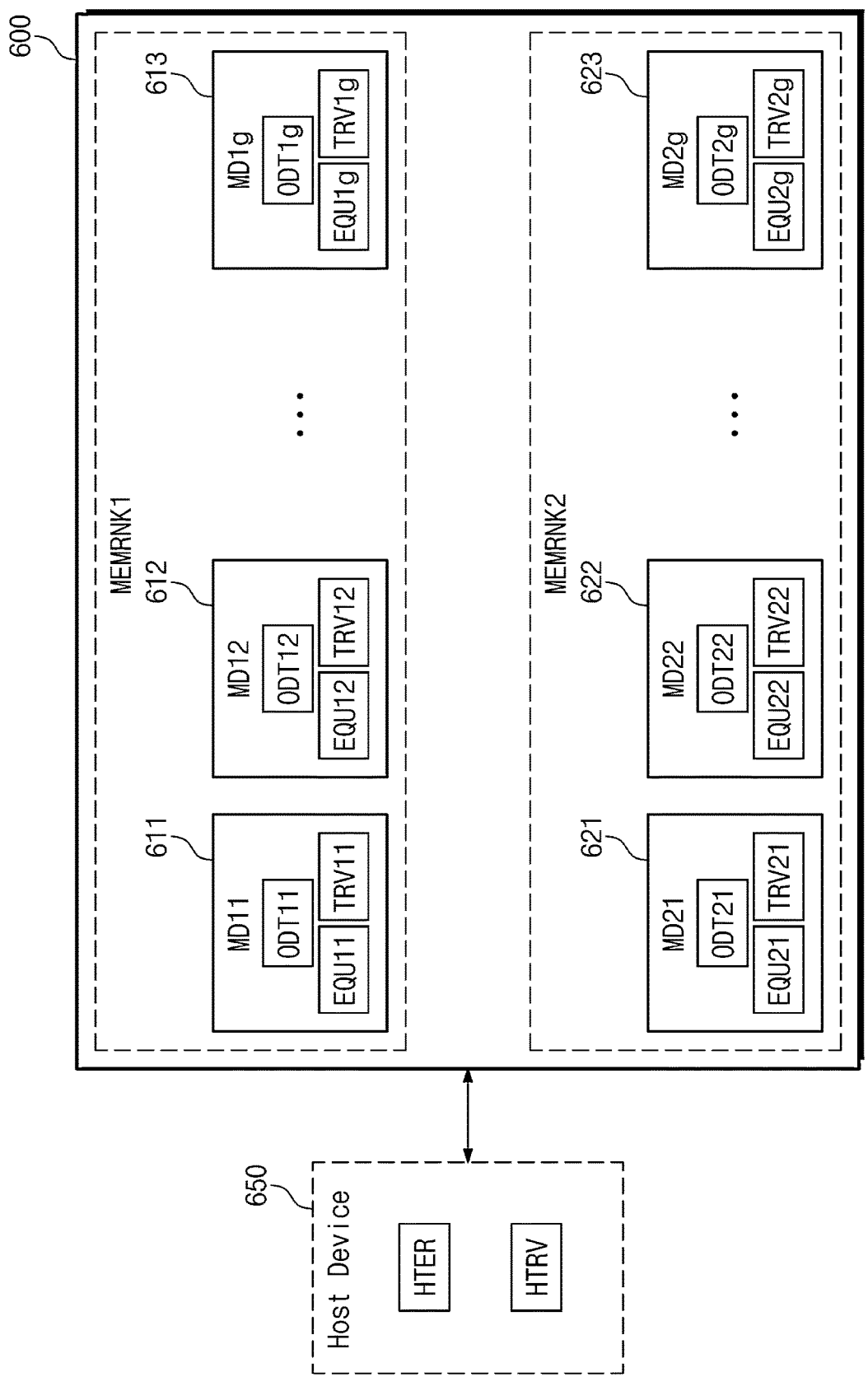
FIG. 9 is a diagram for describing a configuration in which a memory module according to an embodiment of the present disclosure includes memory ranks

FIG. 9 is a diagram for describing a configuration in which a memory module according to an embodiment of the present disclosure includes memory ranks Referring to FIG. 9, a memory module 600 may communicate with a host device 650 through an interface channel, and the memory module 600 and the host device 650 may respectively correspond to the memory module 300 and the host device 200 of FIG. 1.

The host device 650 may include the host-side transceiver circuit HTRV and the host-side termination circuit HTER.

The memory module 600 may include a first memory rank MEMRNK1 and a second memory rank MEMRNK2. The first memory rank MEMRNK1 may include memory devices (MD11, MD12, ..., and MD1g) 611, 612, and 613, and the second memory rank MEMRNK2 may include memory devices (MD21, MD22, ..., and MD2g) 621, 622, and 623. Herein, g may be a natural number equal to or greater than 3.

In an embodiment, the memory device 611 may include an equalizer module EQU11, an ODT module ODT11, and a transceiver module TRV11, the memory device 612 may include an equalizer module EQU12, an ODT module ODT12, and a transceiver module TRV12, and the memory device 613 may include an equalizer module EQU1g, an ODT module ODT1g, and a transceiver module TRV1g. The memory device 621 may include an equalizer module EQU21, an ODT module ODT21, and a transceiver module TRV21, the memory device 622 may include an equalizer module EQU22, an ODT module ODT22, and a transceiver module TRV22, and the memory device 623 may include an equalizer module EQU2g, an ODT module ODT2g, and a transceiver module TRV2g. For example, each of the equalizer modules EQU11, EQU12, and EQU1g may include a plurality of equalizer circuits, each of the ODT modules ODT11, ODT12, and ODT1g may include a plurality of ODT circuits, and each of the transceiver modules TRV11, TRV12, and TRV1g may include a plurality of transceiver circuits.

In an embodiment, the first memory rank MEMRNK1 may include some of the plurality of memory devices 310, 330, 350, ..., 370, ..., and 390 of FIG. 1, and the second memory rank MEMRNK2 may include the others of the plurality of memory devices 310, 330, 350, ... 370, ..., and 390.

Figure 10A:
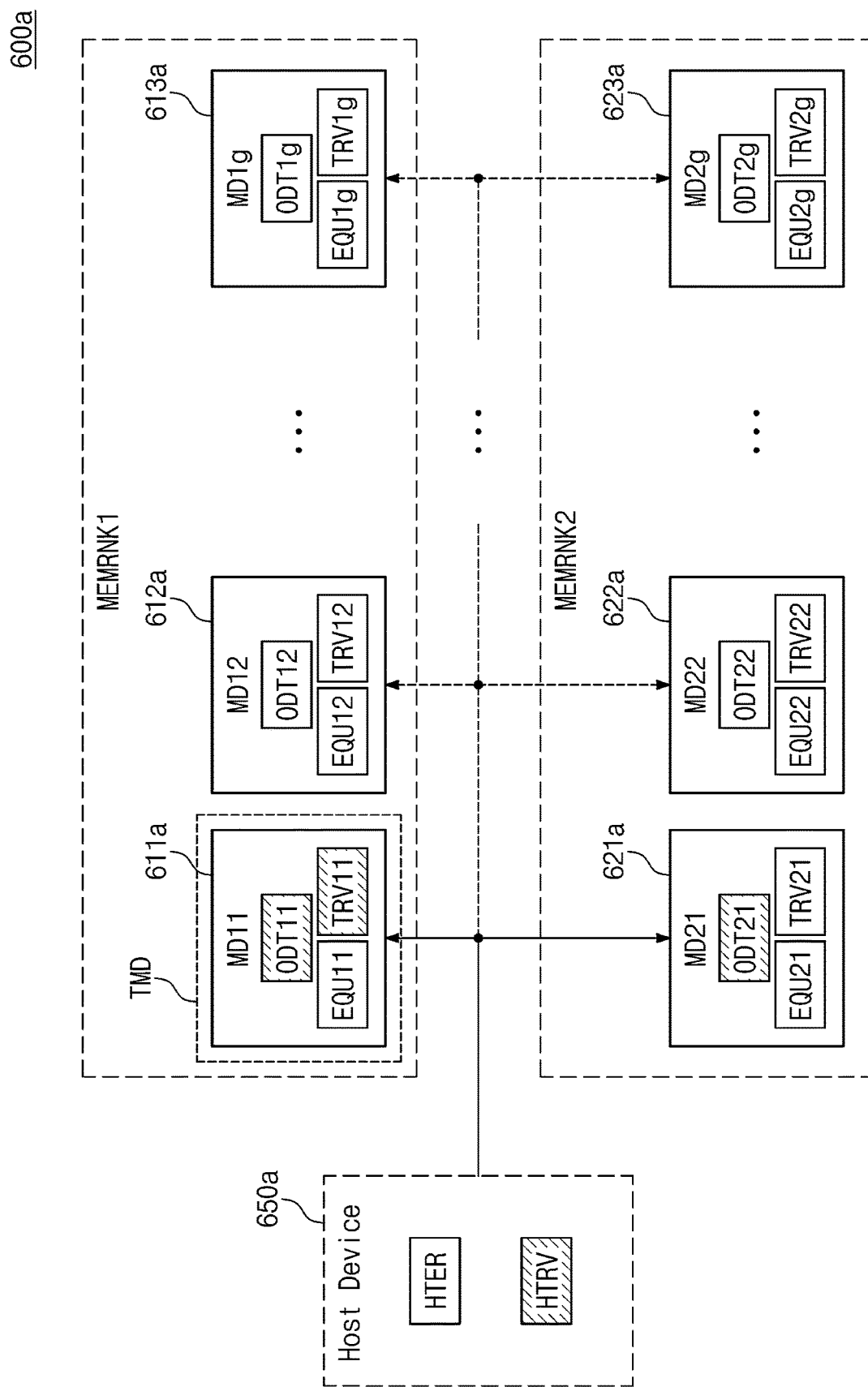
FIGS. 10A and 10B are diagrams for describing data paths formed in a memory module of FIG. 9 in a write operation of the memory module according to example embodiments.
Figure 10B:
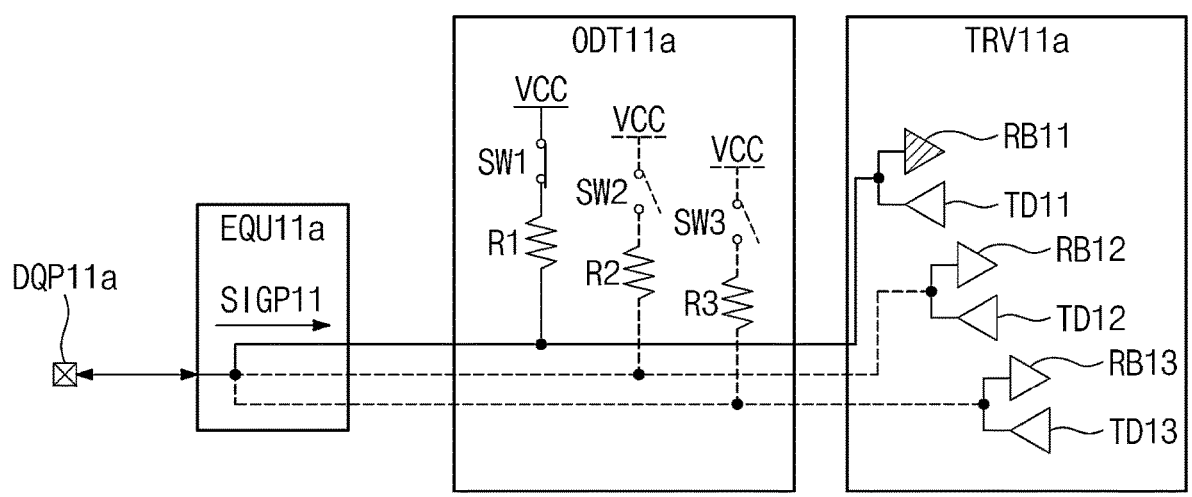

FIGS. 10A and 10B are diagrams for describing data paths formed in a memory module of FIG. 9 in a write operation of the memory module according to example embodiments.

Referring to FIGS. 9 and 10A, a memory module 600a may correspond to the memory module 600 of FIG. 9.

The memory module 600a may include the first memory rank MEMRNK1 and the second memory rank MEMRNK2. The first memory rank MEMRNK1 may include memory devices (MD11, MD12, ..., and MD1g) 611a, 612a, and 613a, and the second memory rank MEMRNK2 may include memory devices (MD21, MD22, ..., and MD2g) 621a, 622a, and 623a.

In the write operation of the memory module 600a, in which data are written in the memory device 611a among the memory devices 611a, 612a, and 613a included in the first memory rank MEMRNK1, the memory device 611a may be referred to as a "target memory device TMD", and the memory devices 612a and 613a included in the first memory rank MEMRNK1 and the memory devices 621a, 622a, and 623a included in the second memory rank MEMRNK2 may be referred to as "non-target memory devices". In this case, the ODT module ODT11 and the transceiver module TRV11 included in the memory device 611a may be activated, and the ODT module ODT21 that is included in the memory device 621a belonging to any other memory rank and corresponding to the memory device 611a may be activated.

In an embodiment, when data are written in the memory device 611a, a plurality of equalizer circuits included in the memory device 611a may include a plurality of first inductors. Data paths for the write operations may be formed through one or more first intervention inductors among the plurality of first inductors. In this case, the first intervention inductors may be inductors, which are included in the memory device 611a and are connected to one or more resistors connected to the power supply voltage, from among the plurality of first inductors.

Referring to FIGS. 9, 10A, and 10B, the memory device 611a may include an equalizer circuit EQU11a, an ODT circuit ODT11a, and a transceiver circuit TRV11a connected to a data input/output pad DQP11a. The equalizer circuit EQU11a may be illustrated as an example of one of a plurality of equalizer circuits included in the equalizer module EQUT11, the ODT circuit ODT11a may be illustrated as an example of one of a plurality of ODT circuits included in the ODT module ODT11, and the transceiver circuit TRV11a may be illustrated as an example of one of a plurality of transceiver circuits included in the transceiver module TRV11.

In the case of writing data in the memory device 611a, only the reception buffer RB11 among transmission drivers (or, transmission buffers) TD11, TD12, and TD13 and reception buffers RB11, RB12, and RB13 included in the transceiver circuit TRV11a may be activated. In the resistors R1, R2, and R3 included in the ODT circuit ODT11a, only the resistor R1 may be connected to a power supply voltage VCC, and the resistors R2 and R3 may not be connected to the power supply voltage VCC. For example, in the case of writing data in the memory device 611a, only some of the resistors R1, R2, and R3 may be connected to the power supply voltage VCC for activation based on the driver strength of the host-side transceiver circuit HTRV of a host device 650a, and thus, impedance matching may be made. In the case of writing data in the memory device 611a, the number of resistors, which are connected to the power supply voltage VCC, from among the resistors R1, R2, and R3 and resistance values thereof may be individually determined based on the hardware requirements of users using the memory module 600a. In this case, a data path SIGP11 may be formed through an inductor, which is connected to the resistor R1 connected to the power supply voltage VCC, from among a plurality of inductors included in the equalizer circuit EQU11a.

Figure 11:
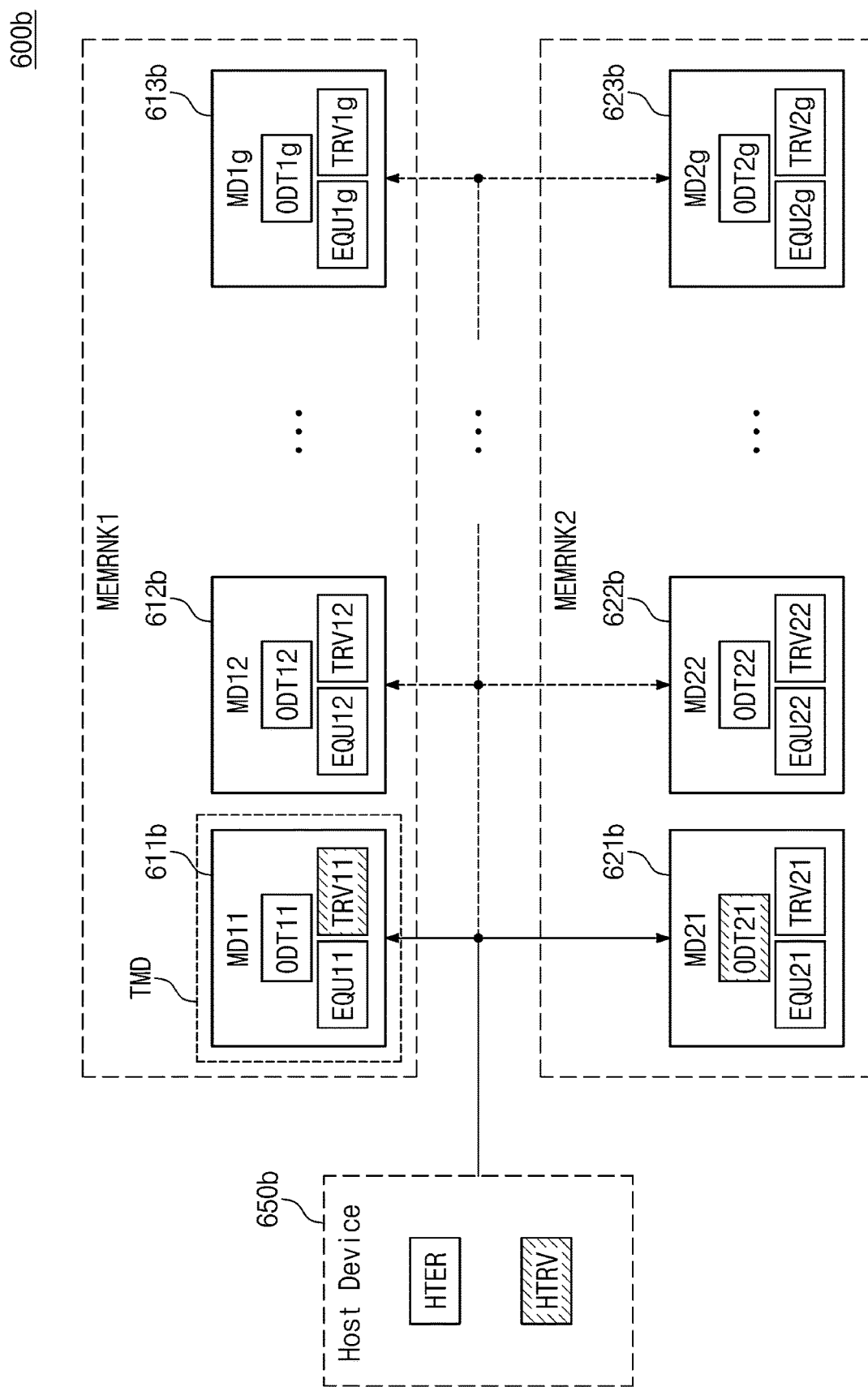
FIG. 11 is a diagram for describing data paths formed in a memory module of FIG. 9 in a read operation of the memory module according to example embodiments.

FIG. 11 is a diagram for describing data paths formed in a memory module of FIG. 9 in a read operation of the memory module according to example embodiments.

Referring to FIGS. 9 and 11, a memory module 600b may correspond to the memory module 600 of FIG. 9.

The memory module 600b may include the first memory rank MEMRNK1 and the second memory rank MEMRNK2. The first memory rank MEMRNK1 may include memory devices (MD11, MD12, . . . , and MD1g) 611b, 612b, and 613b, and the second memory rank MEMRNK2 may include memory devices (MD21, MD22, . . . , and MD2g) 621b, 622b, and 623b.

In the read operation of the memory module 600b, in which data are read from the memory device 611b among the memory devices 611b, 612b, and 613b included in the first memory rank MEMRNK1, the memory device 611b may be referred to as a "target memory device TMD", and the memory devices 612b and 613b included in the first memory rank MEMRNK1 and the memory devices 621b, 622b, and 623b included in the second memory rank MEMRNK2 may be referred to as "non-target memory devices". In this case, the transceiver module TRV11 included in the memory device 611b may be activated, and the ODT module ODT21 that is included in the memory device 621b belonging to any other memory rank and corresponding to the memory device 611b may be activated.

In an embodiment, when data are read from the memory device 611b, a plurality of equalizer circuits included in the memory device 611b may include a plurality of first inductors. Data paths for the read operation may be formed through one or more second intervention inductors among the plurality of first inductors. In this case, the second intervention inductors may be inductors, which are included in the memory device 611b and are connected to activated transmission drivers, from among the plurality of first inductors.

Figure 12:
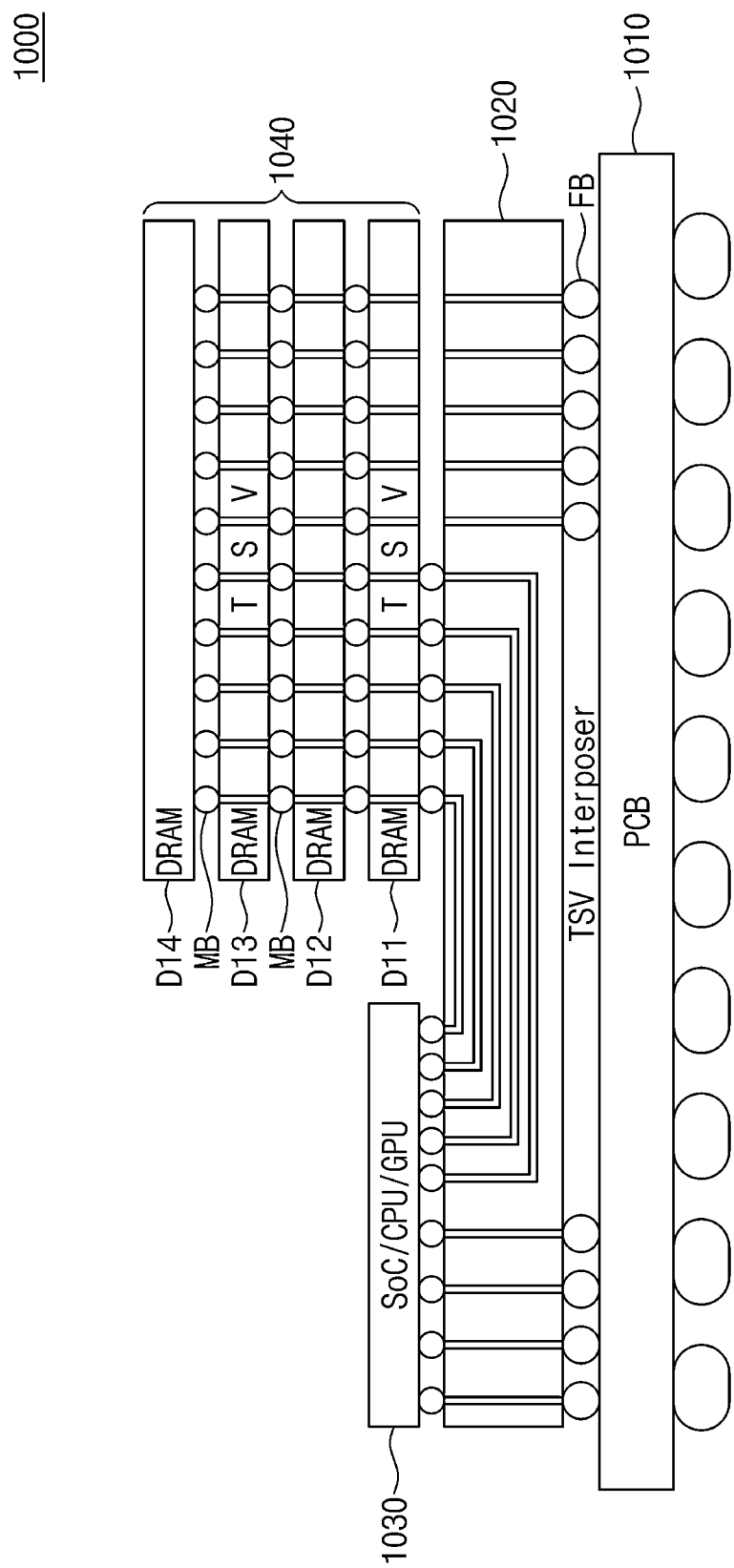
FIG. 12 is a block diagram illustrating an embodiment of a chip structure including a stack-type memory device.

FIG. 12 is a block diagram illustrating an embodiment of a chip structure including a stack-type memory device.

Referring to FIG. 12, a chip structure 1000 may have a chip structure in which a high bandwidth memory (HBM) 1040 including memory dies D11 to D14 is connected to a host device by using an interposer instead of a printed circuit board (PCB). The host device may be the host device 200 of FIG. 1, and the memory dies D11 to D14 may be memory devices 310, 330, 350, . . . , 370, . . . , and 390 of FIG. 1.

An interposer layer 1020 is disposed on a PCB 1010 and is electrically connected to the PCB 1010 through flip chip bumps FB. A host die 1030 including the host device and the memory dies D11 to D14 for forming the structure of the HBM 1040 are disposed on the interposer layer 1020. A buffer die or a logic die may be omitted in FIG. 12 but may be interposed between the memory die D11 and the interposer layer 1020. To implement the structure of the HBM 1040, through-silicon via (TSV) lines are formed in the memory dies D11 to D14. The TSV lines may be electrically connected to micro bumps MB formed between memory dies. The memory dies D11 to D14 may form a plurality of memory ranks or a plurality of memory banks.

Figure 13:
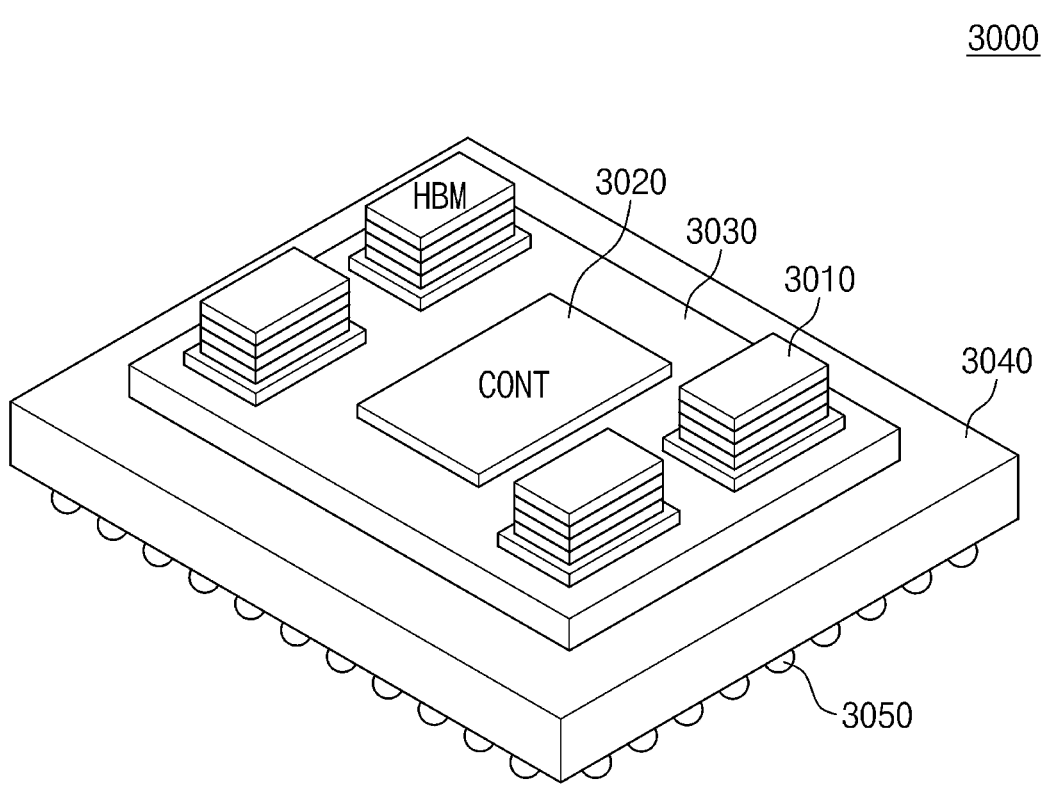
FIG. 13 is a structure diagram illustrating an embodiment of a semiconductor package including a stack-type memory device.

FIG. 13 is a structure diagram illustrating an embodiment of a semiconductor package including a stack-type memory device.

Referring to FIG. 13, a semiconductor package 3000 may include one or more stack-type memory devices 3010 and a memory controller 3020. The stack-type memory device 3010 and the memory controller 3020 may be mounted on an interposer 3030, and the interposer 3030 on which the stack-type memory device 3010 and the memory controller (CONT) 3020 are mounted may be mounted on a package substrate 3040. The memory controller 3020 may perform substantially the same function as the host device 200 of FIG. 1. The stack-type memory device 3010 may be implemented in various shapes. According to an embodiment, the stack-type memory device 3010 may be a memory device that is implemented in the shape of a high bandwidth memory where a plurality of layers are stacked. As such, the stack-type memory device 3010 may include a buffer die and a plurality of memory dies, and each of the plurality of memory dies may include a memory cell array, and a plurality of equalizer circuits, a plurality of ODT circuits, and a plurality of transceiver circuits connected to data input/output pads. The plurality of equalizer circuits may include the components of the equalizer circuit described with reference to FIGS. 1 to 5, 6A to 6C, 7A to 7C, 8, 9, 10A, 10B, and 11.

As described above, a memory module and an electronic system according to an embodiment of the present disclosure may include a plurality of memory devices each including a plurality of equalizer circuits. The plurality of equalizer circuits may utilize the inductive peaking technique to reduce power consumption and may compensate for the loss, which is capable of occurring in the process of transmitting a data signal at a high speed through an interface channel, by using one or more inductors.

The number of equalizer circuits may be equal to one of the number of data input/output pads, the number of ODT circuits, and the numbers of transceiver circuits. The inductances of the one or more inductors included in each of the plurality of equalizer circuits may have individual values that are based on a driver strength by a host device. The plurality of equalizer circuits may improve the performance of an interface channel by reducing the loss capable of occurring in the interface channel by using one or more inductors having inductance values appropriate for various operations of a memory module.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory module comprising:
   a plurality of memory devices,
   wherein each of the plurality of memory devices includes:
   a plurality of data input/output pads;
   a plurality of on-die termination (ODT) circuits each including one or more resistors;
   a plurality of transceiver circuits each including one or more transmission drivers and one or more reception buffers; and
   a plurality of equalizer circuits each including one or more inductors and connected to one of the plurality of data input/output pads, one of the plurality of ODT circuits, and one of the plurality of transceiver circuits,
   wherein each of the one or more transmission drivers is configured to drive a node of one of the plurality of data input/output pads, and
   wherein inductances of the one or more inductors included in each of the plurality of equalizer circuits have individual values which are based on a driver strength of each of the one or more transmission drivers.

2. The memory module of claim 1, wherein a first equalizer circuit among the plurality of equalizer circuits includes a first inductor,
   wherein a first ODT circuit among the plurality of ODT circuits includes a first resistor connected to the first inductor, and
   wherein an inductance value of the first inductor is determined based on a resistance value of the first resistor.

3. The memory module of claim 2, wherein the first ODT circuit further includes a plurality of second resistors,
   wherein the first equalizer circuit further includes a plurality of second inductors, and
   wherein the number of the resistors of the first ODT circuit is equal to the number of the inductors of the first equalizer circuit.

4. The memory module of claim 3, wherein a first end of each of the first inductor and the plurality of second inductors is connected to a first node, and a second end thereof is respectively connected to one of the first resistor and the plurality of second resistors.

5. The memory module of claim 4, wherein an inductance value of the first inductor is proportional to the square of a resistance value of the first resistor.

6. The memory module of claim 5, wherein the first inductor and the plurality of second inductors included in the first equalizer circuit are formed in a first metal layer on a substrate as a plurality of patterns, and
   wherein portions of the plurality of patterns are formed on virtual concentric rectangles of the first metal layer.

7. The memory module of claim 6, wherein the plurality of patterns include first to third patterns,
   wherein the first inductor is formed as the first pattern,
   wherein the plurality of second inductors include a second inductor formed as the second pattern and a third inductor formed as the third pattern,
   wherein the inductance value of the first inductor is greater than an inductance value of each of the second and third inductors, and
   wherein the first pattern is formed to be closer to the outside than each of the second and third patterns, on the virtual concentric rectangles.

8. The memory module of claim 2, wherein the first ODT circuit further includes a plurality of second resistors,
   wherein the first equalizer circuit further includes a plurality of second inductors and a third inductor connected to the first inductor and the plurality of second inductors, and
   wherein the number of the resistors of the first ODT circuit is "X," X being an integer of 1 or more, and the number of the inductors of the first equalizer circuit is (X+1).

9. The memory module of claim 8, wherein the first inductor and the plurality of second inductors form a T-coil.

10. The memory module of claim 8, wherein a first end of the third inductor is connected to a first node, and a second end thereof is connected to a second node, and
    wherein a first end of each of the plurality of second inductors is connected to the second node, and a second end thereof is respectively connected to one of the plurality of second resistors.

11. The memory module of claim 10, wherein an inductance value of a second inductor among the plurality of second inductors is proportional to the square of a resistance value of a second resistor connected to the second inductor from among the plurality of second resistors.

12. The memory module of claim 11, wherein the first inductor, the plurality of second inductors, and the third inductor included in the first equalizer circuit are formed in a first metal layer on a substrate as a plurality of patterns, and
    wherein portions of patterns corresponding to the first inductor and the plurality of second inductors from among the plurality of patterns are formed on virtual concentric rectangles of the first metal layer.

13. The memory module of claim 1, wherein the memory module includes a first memory rank and a second memory rank, wherein the first memory rank includes some of the plurality of memory devices, and the second memory rank includes the others of the plurality of memory devices, wherein, in a write operation of the memory module, in which data are written in a first memory device among memory devices included in the first memory rank, data paths are formed through one or more first intervention inductors among first inductors included in the plurality of equalizer circuits, and wherein the one or more first intervention inductors are inductors, which are included in the first memory device and are connected to one or more resistors connected to a power supply voltage.

14. The memory module of claim 13, wherein, in a read operation of the memory module, in which data are read from the first memory device, data paths are formed through one or more second intervention inductors among the first inductors, and wherein, the one or more second intervention inductors are inductors, which are included in the first memory device and are connected to activated transmission drivers.

15. A memory module comprising:
a plurality of memory devices,
wherein each of the plurality of memory devices includes:
a plurality of data input/output pads;
a plurality of transceiver circuits each including one or more transmission buffers and one or more reception buffers; and
a plurality of equalizer circuits each including one or more inductors and connected to one of the plurality of data input/output pads and one of the plurality of transceiver circuits,
wherein each of the one or more transmission buffers is configured to drive a node of one of the plurality of data input/output pads, and
wherein inductances of the one or more inductors included in each of the plurality of equalizer circuits have individual values which are based on a driver strength of each of the one or more transmission buffers.

16. The memory module of claim 15, wherein the one or more transmission buffers are configured to:
operate as one or more on-die termination (ODT) circuits in a write operation of each of the memory devices, and
operate as one or more transmission drivers in a read operation of each of the memory devices,
wherein a first equalizer circuit among the plurality of equalizer circuits includes a first inductor,
wherein a first transmission buffer among the one or more transmission buffers includes a first resistor connected to the first inductor, and
wherein an inductance value of the first inductor is determined to be proportional to a resistance value of the first resistor.

17. The memory module of claim 15, wherein a first transceiver circuit among the plurality of transceiver circuits includes one or more transmission buffers each including a resistor, and
wherein a first equalizer circuit among the plurality of equalizer circuits includes one or more inductors each connected to one of the one or more transmission buffers.

18. The memory module of claim 17, wherein the number of the resistors of the first transceiver circuit is equal to the number of the inductors of the first equalizer circuit.

19. The memory module of claim 17, wherein the number of the resistors of the first transceiver circuit is "X," X being an integer of 1 or more, and the number of the inductors of the first equalizer circuit is (X+1).

20. An electronic system comprising:
a host device; and
a memory module configured to operate under control of the host device,
wherein the memory module includes a plurality of memory devices,
wherein each of the plurality of memory devices includes:
a plurality of data input/output pads;
a plurality of on-die termination (ODT) circuits each including one or more resistors;
a plurality of transceiver circuits each including one or more transmission drivers and one or more reception buffers; and
a plurality of equalizer circuits each including one or more inductors and connected to one of the plurality of data input/output pads, one of the plurality of ODT circuits, and one of the plurality of transceiver circuits,
wherein the host device is configured to drive each of the plurality of memory devices,
wherein inductances of the one or more inductors included in each of the plurality of equalizer circuits have individual values which are based on resistance values of one or more resistors included in each of the plurality of ODT circuits, and
wherein the resistance values of the one or more resistors included in each of the plurality of ODT circuits are determined based on a driver strength of the host device.

* * * * *